(12) United States Patent
Tsukanaka

(10) Patent No.: US 11,253,787 B2
(45) Date of Patent: Feb. 22, 2022

(54) SERVER SYSTEM AND PLAY DATA COMMUNITY SYSTEM FOR MODIFIED REPRODUCTION PLAY

(71) Applicant: BANDAI NAMCO ENTERTAINMENT INC., Tokyo (JP)

(72) Inventor: Kensuke Tsukanaka, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 14 days.

(21) Appl. No.: 16/832,497

(22) Filed: Mar. 27, 2020

(65) Prior Publication Data

US 2020/0306651 A1 Oct. 1, 2020

(30) Foreign Application Priority Data

Mar. 29, 2019 (JP) .............................. JP2019-066481

(51) Int. Cl.
| | |
|---|---|
| *A63F 13/497* | (2014.01) |
| *A63F 13/86* | (2014.01) |
| *A63F 13/87* | (2014.01) |
| *A63F 13/35* | (2014.01) |
| *A63F 13/79* | (2014.01) |

(52) U.S. Cl.
CPC .............. *A63F 13/87* (2014.09); *A63F 13/35* (2014.09); *A63F 13/497* (2014.09); *A63F 13/79* (2014.09); *A63F 13/86* (2014.09); *A63F 2300/572* (2013.01); *A63F 2300/577* (2013.01); *A63F 2300/634* (2013.01)

(58) Field of Classification Search
None
See application file for complete search history.

(56) References Cited

U.S. PATENT DOCUMENTS

| | | | | |
|---|---|---|---|---|
| 2003/0190951 A1* | 10/2003 | Matsumoto | ............. | A63F 13/63 463/30 |
| 2017/0001111 A1* | 1/2017 | Willette | ................... | A63F 13/49 |
| 2017/0136360 A1* | 5/2017 | Smith | ..................... | A63F 13/00 |
| 2017/0209790 A1 | 7/2017 | Nomura | | |

FOREIGN PATENT DOCUMENTS

| | | |
|---|---|---|
| JP | 2016-042238 A | 3/2016 |
| JP | 2018-011849 A | 1/2018 |

* cited by examiner

*Primary Examiner* — Damon J Pierce
(74) *Attorney, Agent, or Firm* — Oliff PLC

(57) ABSTRACT

A server system reproduces a past gameplay based on original data in a virtual three-dimensional space and displays the scenes of the gameplay on a user terminal of a live commentary user. Along with this, the server system causes a live commentary object having not existed in the original gameplay to appear in the virtual three-dimensional space in accordance with a live commentary addition operation by the live commentary user, and adds an additional virtual camera (additional camera CM1) to the virtual three-dimensional space to modify the reproduction play of the original gameplay. The server system generates modified reproduction data capable of reproducing a modified reproduction play and manages the modified reproduction data in association with the original data.

22 Claims, 32 Drawing Sheets

(1)

(2) [ACTIVATION OF REACTION]

SERVER SYSTEM AND PLAY DATA COMMUNITY SYSTEM FOR MODIFIED REPRODUCTION PLAY

This application is based upon and claims the benefit of priority to Japanese Patent Application No. 2019-066481 filed on Mar. 29, 2019, the entire contents of which are incorporated herein by reference.

BACKGROUND

The way of enjoying a video game is not limited to playing the game. It is known that game players can find pleasure in publishing videos of gameplay to viewers or sharing the screens of gameplay among friends. For example, Japanese Patent Application Publication No. 2018-11849 discloses a technique of a video distribution system capable of distributing various types of video images as well as game video images. Japanese Patent Application Publication No. 2016-42238 discloses a technique of allowing guest users to watch images of games played by host users in real time.

It is expected that enjoying one gameplay as a material (in an informal expression, as "fun and games") by a plurality of users will activate communication among the users, thereby greatly enhancing the appeal of the game. However, the conventional methods have limitations in allowing a plurality of users to enjoy one gameplay as a material.

DESCRIPTION OF EXEMPLARY EMBODIMENTS

Figure 1:
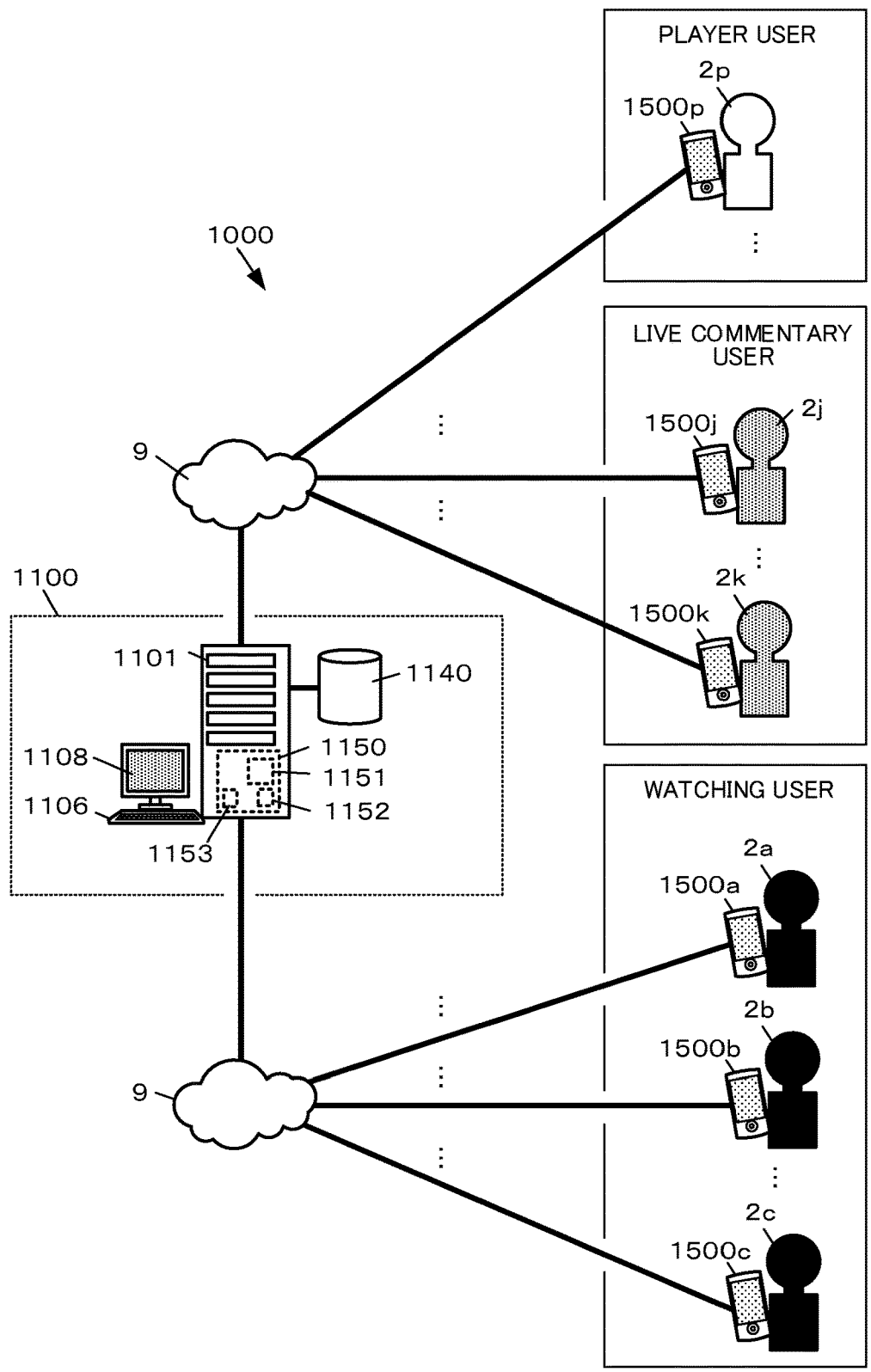
FIG. 1 is a diagram illustrating a configuration example of a play data community system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

In accordance with one of some embodiments, there is provided a server system comprising:

at least one processor or circuit programmed to:

execute a first terminal replay output control to reproduce a past gameplay based on original data capable of reproducing the gameplay to replay and output the original gameplay from a first user terminal while generating first modified reproduction data capable of reproducing a first modified reproduction play, the first modified reproduction play being a reproduction play in which the original gameplay is modified in accordance with an operation input on the first user terminal;

execute a second terminal replay output control to reproduce the first modified reproduction play based on the first modified reproduction data to replay and output from a second user terminal while generating second modified reproduction data capable of reproducing a second modified reproduction play, the second modified reproduction play being a reproduction play in which the first modified reproduction play is modified in accordance with an operation input on the second user terminal; and perform a control to present the original gameplay, the first modified reproduction play, and the second modified reproduction play on a third user terminal in a selectable manner and reproduce a selected play to replay and output from the third user terminal.

The "server system" here may be formed by a single computer or a plurality of computers in cooperation. The "first user terminal", "second user terminal", and "third user terminal" are described to be identifiable for easy understanding. One or more of these user terminals may be physically identical.

In accordance with one of some embodiments, there may be provided the server system, wherein generating the first modified reproduction data includes at least one of:

a first object appearance control to cause a first object having not existed in the original gameplay to appear in accordance with an operation input on the first user terminal;

a first comment object appearance control to cause a first comment object to appear in accordance with an operation input on the first user terminal;

a first sound superimposition control to superimpose a first sound input from the first user terminal on the original gameplay; and a first point-of-view setting control to set a first point of view as a reference of image generation in accordance with an operation input on the first user terminal.

In accordance with one of some embodiments, there may be provided the server system, wherein generating the second modified reproduction data includes at least one of:

a second object appearance control to cause a second object having not existed in the first modified reproduction play to appear in accordance with an operation input on the second user terminal;

a second comment object appearance control to cause a second comment object to appear in accordance with an operation input on the second user terminal;

a second sound superimposition control to superimpose a second sound input from the second user terminal on the first modified reproduction play; and a second point-of-view setting control to set a second point of view as a reference of image generation in accordance with an operation input on the second user terminal.

In accordance with one of some embodiments, there is provided a server system comprising:

at least one processor or circuit programmed to:

execute a first terminal replay output control to reproduce a past gameplay based on original data capable of reproducing the gameplay to replay and output the original gameplay from a first user terminal while generating first modified reproduction data capable of reproducing a first modified reproduction play, the first modified reproduction play being a reproduction play in which the original gameplay is modified in accordance with an operation input on the first user terminal;

execute a second terminal replay output control to reproduce the gameplay based on the original data to replay and output the original gameplay from the second user terminal while generating second modified reproduction data capable of reproducing a second modified reproduction play, the second modified reproduction play being a reproduction play in which the original gameplay is modified in accordance with an operation input on the second user terminal; and perform a control to present the original gameplay, the first modified reproduction play, and the second modified reproduction play on a third user terminal in a selectable manner and reproduce a selected play to replay and output from the third user terminal.

In accordance with one of some embodiments, there may be provided the server system, wherein generating the first modified reproduction data includes at least one of:

a first object appearance control to cause a first object having not existed in the original gameplay to appear in accordance with an operation input on the first user terminal;

a first comment object appearance control to cause a first comment object to appear in accordance with an operation input on the first user terminal;

a first sound superimposition control to superimpose a first sound input from the first user terminal on the original gameplay; and a first point-of-view setting control to set a first point of view as a reference of image generation in accordance with an operation input on the first user terminal.

In accordance with one of some embodiments, there may be provided the server system as defined in claim 21, wherein generating the second modified reproduction data includes at least one of:

a second object appearance control to cause a second object having not existed in the original gameplay to appear in accordance with an operation input on the second user terminal;

a second comment object appearance control to cause a second comment object to appear in accordance with an operation input on the second user terminal;

a second sound superimposition control to superimpose a second sound input from the second user terminal on the original gameplay; and a second point-of-view setting control to set a second point of view as a reference of image generation in accordance with an operation input on the second user terminal.

As a result, in some embodiments, it is possible to, for each of users other than the player, such as a live commentator and a viewer, cause new objects (first object, second object) different from objects in the original gameplay to come on the scene, cause new comment objects (first comment object, second comment object) to appear, add new points of view (first point of view, second point of view) different from the point of view for generating a game screen of the original gameplay, and add new sounds (first sound, second sound) different from the sounds of the original gameplay. Then, it is possible to watch not only the original gameplay but also a reproduction play that is modified by addition of new objects, points of view, and sounds. That is, the actions of the live commentator and the viewer are reflected in the reproduction play in which the original gameplay is reproduced. This makes it possible to provide a technique for implementing a new and innovative way of enjoying the original gameplay.

In accordance with one of some embodiments, there may be provided the server system, wherein the original data includes data capable of reconstructing a virtual three-dimensional space during the gameplay, the first modified reproduction data includes data capable of reconstructing a virtual three-dimensional space during the first modified reproduction play, and the second modified reproduction data includes data capable of reconstructing a virtual three-dimensional space during the second modified reproduction play.

As a result, in some embodiments, the advantageous effects described above can be obtained in a game using 3DCG where an object and a virtual camera are arranged in the virtual three-dimensional space and the scenes in the virtual three-dimensional space captured by the virtual camera is provided on the gameplay screen.

In accordance with one of some embodiments, there may be provided the server system, wherein the original data includes data of an original point of view as a reference for generating an image of the gameplay, generating the first modified reproduction data includes performing the first point-of-view setting control, generating the second modified reproduction data includes performing the second point-of-view setting control, and performing the control to replay and output from the third user terminal includes: in a case of replaying and outputting the original gameplay from the third user terminal, outputting a video image of the original gameplay viewed from the original point of view from the third user terminal; in a case of replaying and outputting the first modified reproduction play from the third user terminal, outputting a video image of the first modified reproduction play viewed from the first point of view from the third user terminal; and in a case of outputting the second modified reproduction play from the third user terminal, outputting a video image of the second modified reproduction play viewed from the second point of view from the third user terminal.

In accordance with one of some embodiments, there may be provided the server system, wherein the original data includes data of an original point of view as a reference for generating an image of the gameplay, generating the first modified reproduction data includes performing the first point-of-view setting control, generating the second modified reproduction data includes performing the second point-of-view setting control, and performing the control to replay and output from the third user terminal includes performing a control to present the original point of view, the first point of view, and the second point of view on the third user terminal in a selectable manner and output a video image of the selected play viewed from a selected point of view from the third user terminal.

As a result, in some embodiments, it is possible to implement new ways of enjoying a game such as adding new camerawork different from the camerawork in the original gameplay and allowing images of the reproduction play to be watched from a point of view related to the added new camerawork.

In accordance with one of some embodiments, there may be provided the server system, wherein generating the first modified reproduction data includes performing the first sound superimposition control, generating the second modified reproduction data includes performing the second sound superimposition control, and performing the control to replay and output from the third user terminal includes performing a control to present the first sound and the second sound on the third user terminal in a selectable manner and output a sound in reproducing the selected play as a selected sound from the third user terminal.

As a result, in some embodiments, it is possible to implement new ways of enjoying a game such as adding new sounds different from the sounds in the original gameplay and allowing the reproduction play to be watched with superimposition of the new added sounds.

In accordance with one of some embodiments, there may be provided the server system, wherein generating the first modified reproduction data includes performing the first comment object appearance control, generating the second modified reproduction data includes performing the second comment object appearance control, and performing the control to replay and output from the third user terminal includes performing a control to present the first comment object and the second comment object on the third user terminal in a selectable manner and cause a comment object selected in accordance with a selection operation on the third user terminal to appear at the time of reproduction of the selected play.

As a result, in some embodiments, the first user and the second user can add separate comment objects, and the third user as the watching user can watch the reproduction play in which all the added comment objects appear or can watch the reproduction play in which the comment object of the selected user appears an application.

In accordance with one of some embodiments, there may be provided the server system, wherein generating the first modified reproduction data includes setting a replay speed based on an operation input on the first user terminal in the first terminal replay output control and generating the first modified reproduction data including setting of the replay speed.

In accordance with one of some embodiments, there may be provided the server system, wherein generating the second modified reproduction data includes setting a replay speed based on an operation input on the second user terminal in the second terminal replay output control and generating the second modified reproduction data including setting of the replay speed.

As a result, in some embodiments, it is possible to set replay speeds different from that in the original gameplay (for example, slow motion, frame-by-frame advance, fast forward, reverse, jump, and others). That is, the users other than the player, such as the live commentator and the viewer, can create the reproduction play at a replay speed different from that in the original gameplay.

In accordance with one of some embodiments, there may be provided the server system, wherein generating the first modified reproduction data includes setting a replay in accordance with an operation input on the first user terminal in the first terminal replay output control and generating the first modified reproduction data including setting of the replay.

In accordance with one of some embodiments, there may be provided the server system, wherein generating the second modified reproduction data includes setting a replay in accordance with an operation input on the second user terminal in the second terminal replay output control and generating the second modified reproduction data including setting of the replay.

As a result, in some embodiments, it is possible to set the replay with an appropriate timing in the original gameplay. For example, it is possible to create a reproduction play to which a scene of playing back a part of the original gameplay is added.

In accordance with one of some embodiments, the server system may further comprise a game progress control function to replay a reproduction play, wherein generating the first modified reproduction data includes causing the game progress control function to replay a reproduction play with setting of an adaptation in accordance with an operation input on the first user terminal in the first terminal replay output control, and generating the first modified reproduction data including the setting of the adaptation.

In accordance with one of some embodiments, there may be provided the server system, wherein the game progress control function automatically controls a computer-controlled object in a reproduction play, and generating the first modified reproduction data includes setting an adaptation that has an influence on the computer-controlled object in accordance with an operation input on the first user terminal.

In accordance with one of some embodiments, the server system may further comprise a game progress control function to replay a reproduction play, wherein generating the second modified reproduction data includes causing the game progress control function to replay a reproduction play with setting of an adaptation in accordance with an operation input on the second user terminal in the second terminal replay output control, and generating the second modified reproduction data including the setting of the adaptation.

In accordance with one of some embodiments, there may be provided the server system, wherein the game progress control function automatically controls a computer-controlled object in a reproduction play, and generating the second modified reproduction data includes setting an adaptation that has an influence on the computer-controlled object in accordance with an operation input on the second user terminal.

As a result, in some embodiments, it is possible to implement a reproduction play in which adaptations are made, such as "if . . . " and "What if I did xx?" situations that would not occur in the original gameplay.

In accordance with one of some embodiments, there may be provided the server system, wherein the at least one processor or circuit is further programmed to:

generate and register the original data based on data with which gameplay was performed on the user terminal.

As a result, in some embodiments, it is possible to generate the original data based on the data with which gameplay was performed on the user terminal.

In accordance with one of some embodiments, there may be provided the server system, wherein the at least one processor or circuit is further programmed to:

perform a control to automatically post a video of reproducing the first modified reproduction play based on the first modified reproduction data and/or a video of reproducing the second modified reproduction play based on the second modified reproduction data to a predetermined video site.

As a result, in some embodiments, it is possible to allow watching of the reproduction play on electronic devices other than the user terminal.

In accordance with one of some embodiments, a play data community system may comprise:

a plurality of user terminals; and the server system that is communicable with the plurality of user terminals.

As a result, in some embodiments, it is possible to implement the play data community system that produces the same advantageous effects as those of the disclosure described above.

Exemplary embodiments are described below. Note that the following exemplary embodiments do not in any way limit the scope of the content defined by the claims laid out herein. Note also that all of the elements described in the present embodiment should not necessarily be taken as essential elements Hereinafter, examples of the embodiments of the present disclosure will be described. However, it is to be noted that the modes to which the present disclosure is applicable are not limited to the following embodiments.

First Embodiment

FIG. 1 is a diagram illustrating a configuration example of a play data community system 1000 according to the present embodiment. The play data community system 1000 includes a server system 1100 and a plurality of user terminals 1500 (1500a, 1500b, . . . ) that are connected together via networks 9 in a data communication-capable manner.

The networks 9 refer to communication channels capable of data communication. Specifically, the networks 9 include communication networks such as a local area network (LAN) using a private line (private cable) for direct connection, Ethernet (registered trademark), and the like, a telecommunication network, a cable network, and the Internet. The communication method may be a wired communication method or a wireless communication method.

The server system 1100 includes a keyboard 1106, a touch panel 1108, and a storage 1140. A main body device 1101 has a control board 1150.

The control board 1150 is equipped with various microprocessors such as a central processing unit (CPU) 1151, graphics processing unit (GPU), and digital signal processor (DSP), various IC memories 1152 such as VRAM, RAM, and ROM, and a communication device 1153. The control board 1150 may be implemented partly or entirely by an application specific integrated circuit (ASIC), a field-programmable gate array (FPGA), or a system on a chip (SoC).

Through a calculation process performed by the control board 1150 based on a predetermined program and data, the server system 1100 implements:

1) user management functions of user registration and user information management;
2) game service function of providing data necessary for a user 2 (2a, 2b, . . . ) as a registered user to perform gameplay as a player on a user terminal 1500 (1500a, 1500b, . . . );
3) data generation service function of generating data for displaying a video of reproducing a published and registered gameplay on the user terminal 1500; and
4) publication service function of allowing a video of reproducing a published and registered gameplay to be watched on the user terminal 1500.

FIG. 1 illustrates the server system 1100 as one server device. Alternatively, a plurality of server devices connected on-line may share the user management function, the gameplay function, the data generation service function, and the publication service function. Otherwise, the server system 1100 may be configured such that a plurality of blade servers are connected together via an internal bus in a data communication-capable manner to share the functions. The server system 1100 may be configured such that a plurality of independent server devices installed at remote places perform data communication via the network 9 to serve as the server system 1100 as a whole.

The user terminal 1500 (1500a, 1500c, . . . ) is a computer system that is individually used by the user 2 (2a, 2b, . . . )

for gameplay, addition of live commentary, and watching of a reproduction video of a published and registered gameplay, and is an electronic device that can access the server system 1100 via the network 9. The user terminal 1500 functionally constitutes a game device, an editing device of live commentary video, and a video watching device. The user terminal 1500 according to the present embodiment is a device called smartphone but may be a portable game device, a tablet-type computer, a personal computer, or the like.

Figure 2:
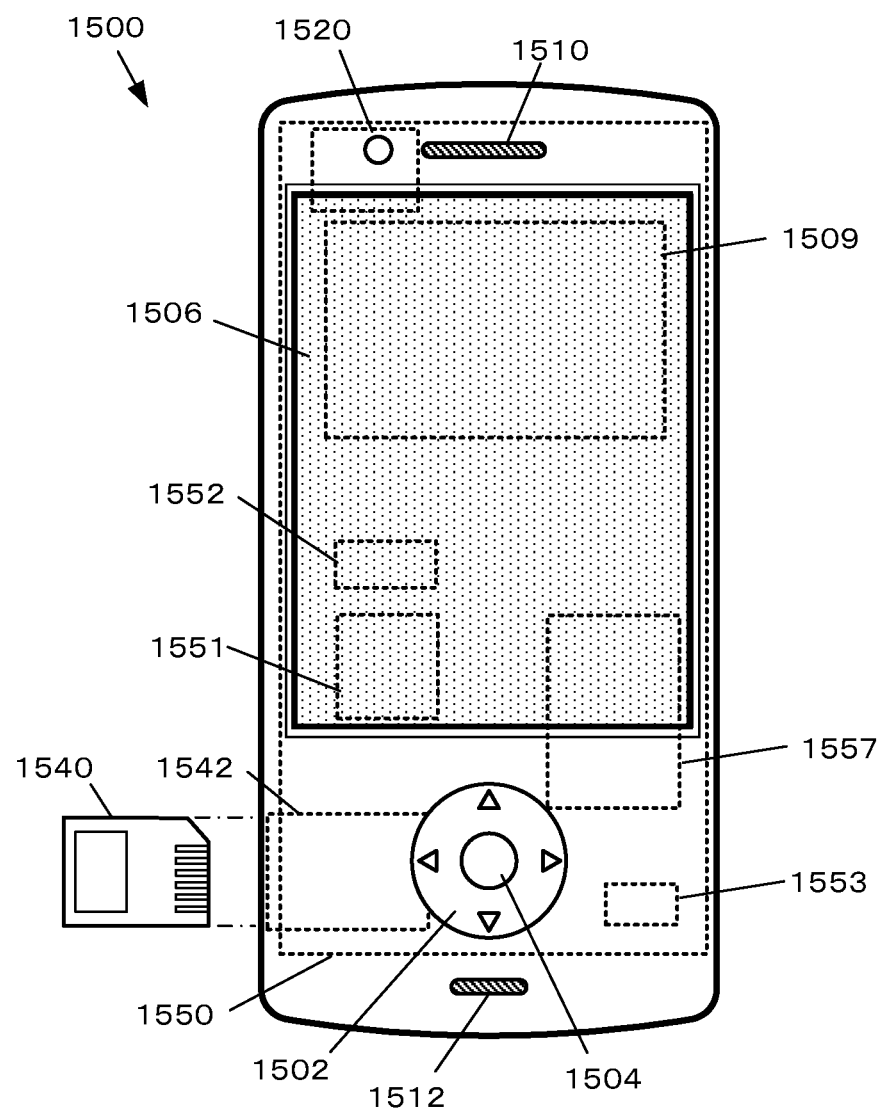
FIG. 2 is a front view of a configuration example of a user terminal.

FIG. 2 is a front view of a configuration example of the user terminal 1500 according to the present embodiment.

The user terminal 1500 includes an arrow key 1502, a button switch 1504, a touch panel 1506 that functions as an image display device and a touch position input device, a speaker 1510, a built-in battery 1509, a microphone 1512, an image sensor unit 1520, a control board 1550, and a memory card reader 1542 that can write and read data on and from a memory card 1540 that is a computer readable storage medium. The user terminal 1500 further includes a power button, a volume control button, and the like (not illustrated). Furthermore, the user terminal 1500 may be provided with an IC card reader that can implement contactless writing and reading of data on and from an IC card, such as a credit card or a prepaid card, usable for payment concerned in gameplay or the like.

The control board 1550 includes:
1) various microprocessors such as the CPU 1551, GPU, and DSP;
2) various IC memories 1552 such as VRAM, RAM, and ROM;
3) a wireless communication module 1553 for performing wireless communication with a mobile phone base station and a wireless LAN base station connected to the network 9; and
4) an interface circuit 1557.

The interface circuit 1557 includes, for example, a driver circuit that drives the touch panel 1506, a circuit that receives signals from the arrow key 1502 and the button switch 1504, an output amplifier circuit that outputs a sound signal to the speaker 1510, an input signal generation circuit that generates a signal corresponding to the sound collected by the microphone 1512, a circuit that inputs image data of an image captured by the image sensor unit 1520, and a signal input-output circuit that inputs and outputs a signal to and from the memory card reader 1542.

These elements mounted on the control board 1550 are electrically connected with each other via a bus circuit or the like to be capable of exchanging data and signals. The control board 1550 may partially or entirely be implemented with an ASIC, an FPGA, or a SoC. The control board 1550 stores programs and various kinds of data, for implementing functions of the user terminal of the game according to the present embodiment, in the IC memory 1552.

The user terminal 1500 may be configured to download programs and various types of setting data from the server system 1100 in the present embodiment. Alternatively, the user terminal 1500 may be configured to read the programs and the data from a storage medium such as the memory card 1540 additionally provided.

Figure 3:
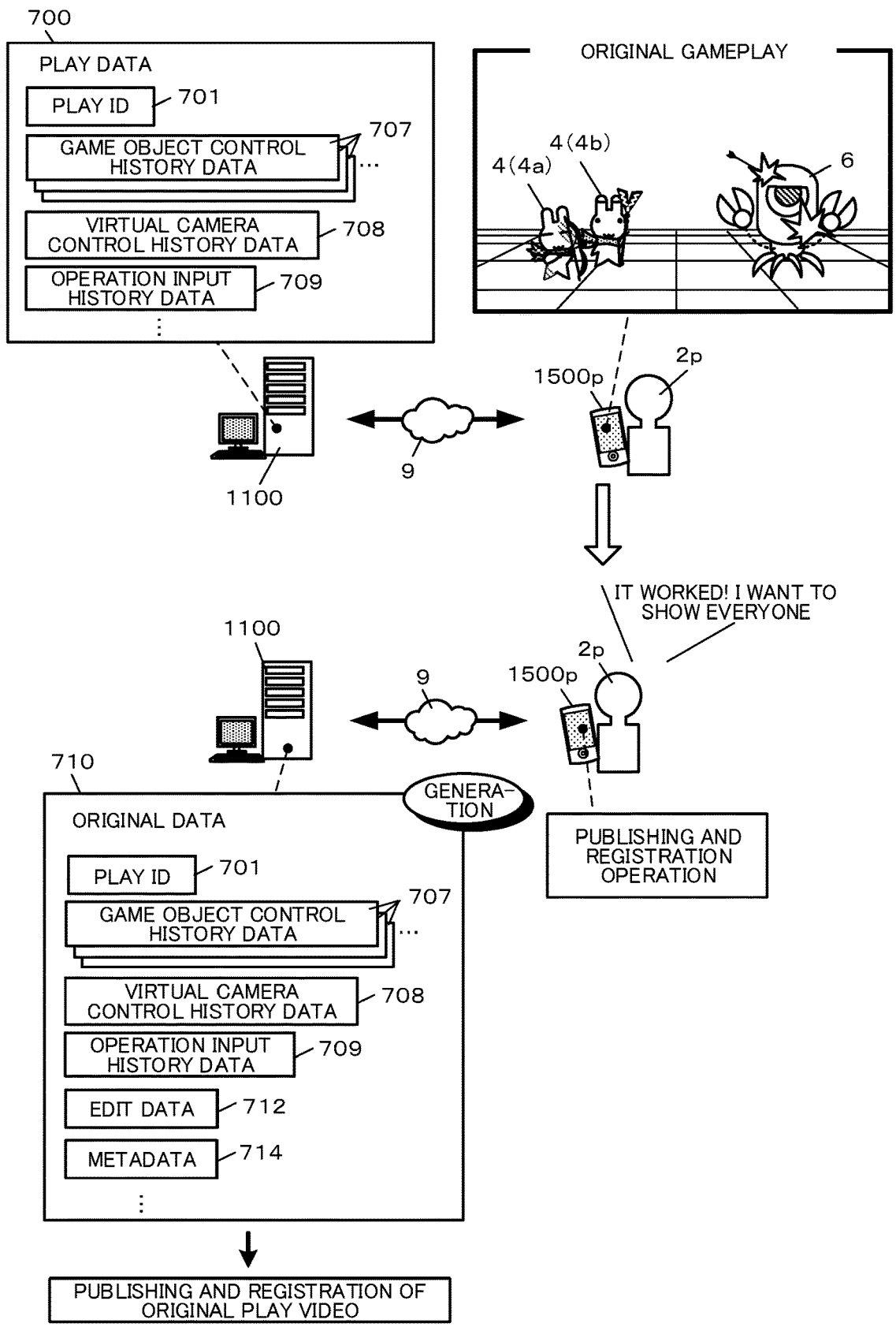
FIG. 3 is a diagram for describing a gameplay.

FIG. 3 is a diagram for describing a gameplay.

The server system 1100 allows an online game to be executed on the user terminal 1500 (the user terminal 1500p in the example of FIG. 3) of the user 2 (the user 2p in the example of FIG. 3) as a player.

The server system 1100 stores play data 700 related to the gameplay. The play data 700 contains various kinds of data related to a game progress control. A game screen according to the present embodiment is generated by 3DCG such that various game objects and virtual cameras are arranged and controlled in a virtual three-dimensional space prepared for gameplay and images captured by the virtual cameras are rendered. Thus, the play data 700 includes a unique play ID 701, game object control history data 707, virtual camera control history data 708, and operation input history data 709.

The game object control history data 707 is prepared for each of the various game objects such as player characters 4 (4a, 4b, . . . ) and an enemy character 6 and contains information necessary for controlling the game objects (for example, position, posture, speed, operation control information in a virtual three-dimensional space, performance parameter values at the game, and others) on a time-series basis.

The virtual camera control history data 708 contains information on the position, posture, and angle of view of a virtual camera (original camera, original point of view) as a reference point of view at the time of generation of images in the original gameplay, on a time-series basis. In the example of FIG. 3, one virtual camera is illustrated. However, a plurality of virtual cameras can be provided as appropriate in the case of switching among these cameras.

The operation input history data 709 contains play operation inputs by the player on a time-series basis.

At the end of the game, when the user 2 as the player inputs a predetermined publishing and registration operation, the server system 1100 publishes and registers a gameplay video (original play video) including the video image of the previous gameplay (original gameplay) in association with necessary data so that the other users can watch these video on the user terminal 1500.

Specifically, the server system 1100 generates original data 710 based on the data included in the play data 700. The original data 710 is data from which the past gameplay can be reproduced and is data from which a virtual three-dimensional space during the original gameplay can be reconstructed. There are various types and formats of data for reproducing the gameplay. In the present embodiment, the data for reproducing the gameplay includes the play ID 701, the game object control history data 707, the virtual camera control history data 708, and the operation input history data 709.

The server system 1100 prepares a virtual three-dimensional space for generating an editing material, arranges and controls game objects and virtual cameras there based on the generated original data 710, reproduces the original gameplay, and generates a video for generating an editing material.

The server system 1100 allows an input of a video editing operation on the player's user terminal 1500p. For example, the server system 1100 provides an interface similar to a publicly known interface for video editing to the user terminal 1500p, and cuts and connects scenes of the gameplay to be published from the video as editing material. Then, the server system 1100 generates edit data 712 and metadata 714 in accordance with the editing operation, and adds the same to the original data 710.

The edit data 712 is definition data for forming and publishing the original gameplay reproduced based on the original data 710 as one video. For example, the edit data 712 contains the scenes for a period of time elapsed from start of the original gameplay in order of editing and cutting. The edit data 712 can be said to be data for determining the video of the gameplay to be reproduced based on the original data 710, that is, the "original play video".

The metadata 714 is accompanying information that is provided at the time of publishing of the original play video. The metadata 714 can include the game title, the user account of the player, the date and time of gameplay, the date and time of registration, video reproduction time, the number of watching times, and others.

Then, the server system 1100 generates thumbnail data for the original play video and publishes and registers the thumbnails as indexes. Accordingly, although the video data as the original play video does not exist, the data for reproducing the video image to be the original play video is prepared for watching. This state means that the video has been posted on a video posting site in the play data community system 1000.

Thus, hereinafter, preparing data for reproducing part or all of gameplay to be published and registering the same as an object to be published will be described as "publishing of a video" or "publishing and registration", and the contents to be reproduced based on the reproducible data will be called "published video".

When videos are published and registered, the thumbnails and the contents of the metadata 714 are provided to the user who wishes to watch a video. The user selects or searches for a desired video using the provided data. As a live commentary user, the user 2 can generate various kinds of data that makes it possible to reproduce a live commentary video (modified video) that is modified by adding live commentary to the published video.

Figure 4:
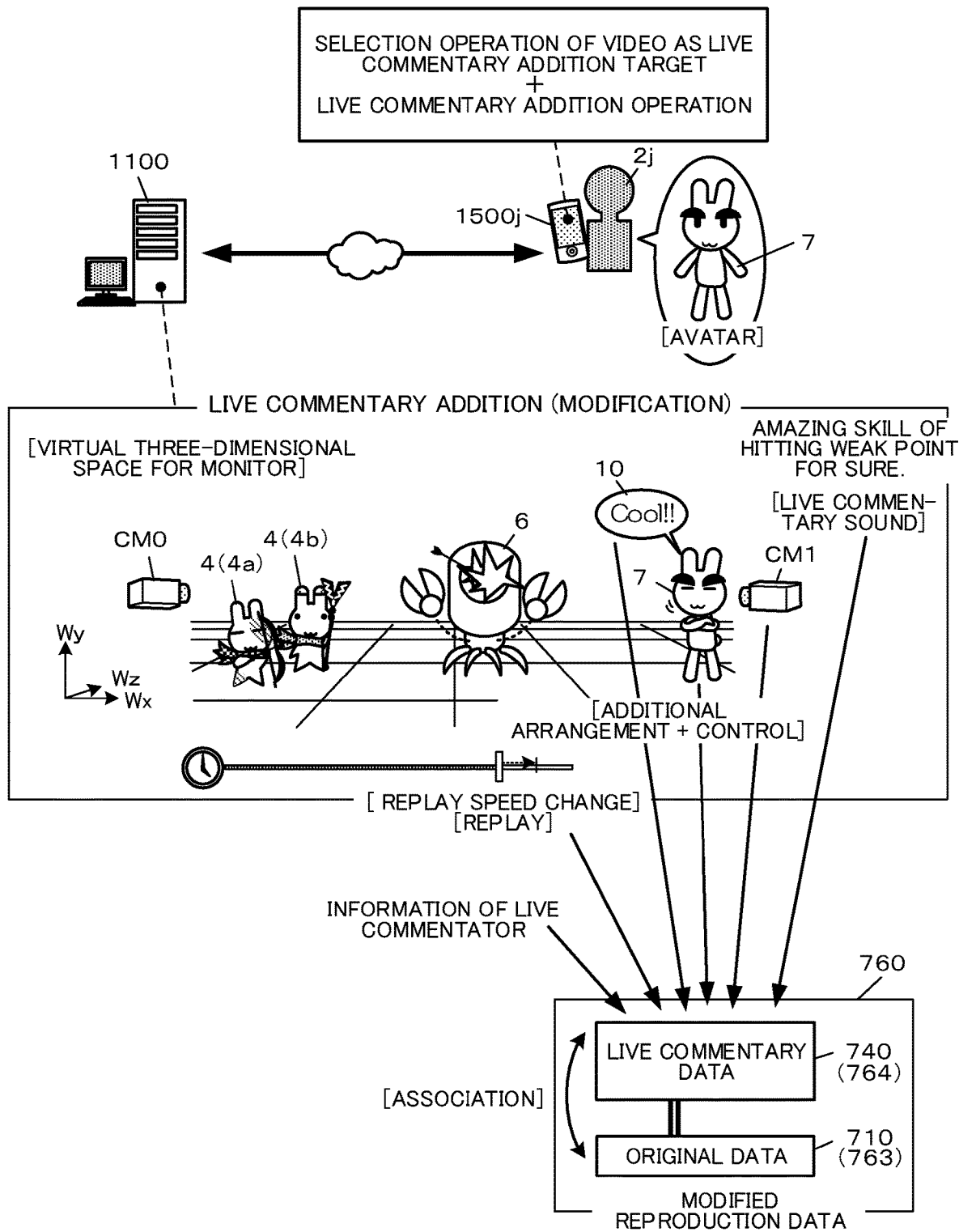
FIG. 4 is a diagram for describing addition of live commentary.

FIG. 4 is a diagram for describing addition of live commentary.

The user 2 as a live commentary user (the user 2j in the example of FIG. 4) uses the user terminal 1500 (the user terminal 1500j in the example of FIG. 4) to perform a predetermined live commentary addition request operation. The server system 1100 starts to accept a live commentary addition operation on the user terminal 1500j having made the request.

Specifically, first, the server system 1100 accepts a selection of a video as a target of live commentary addition from the user terminal 1500j having made the request for live commentary addition, and sets the selected video as a target (material) of live commentary addition. The video as a target of live commentary addition may be any of the videos that are published and registered in the play data community system 1000. The following description is on the assumption that live commentary is added to the original play video.

To add live commentary, the server system 1100 prepares a virtual three-dimensional space for monitor to generate a monitor video image at the time of live commentary addition. Then, the server system 1100 arranges and controls a game object and an original camera CM0 (original point of view: a virtual camera as a point of view used for generating game images in the original gameplay) based on the original data 710 of the video image as a target of live commentary addition in the virtual three-dimensional space for monitor, and reproduces the past original gameplay based on the original data 710. The status of the reproduction is first generated as a monitor video image with the original camera CM0 as a reference point of view, and is displayed on the user terminal 1500j of the live commentary user.

The live commentary user (the user 2j) can perform live commentary addition such as addition of new sounds, addition of new objects, and addition of new points of view (addition of new virtual cameras, addition of new temporal progress, and addition of new controls) which have not existed in the original gameplay.

Specifically, when a live commentary sound input is made on the user terminal 1500j of the live commentary user 2j, the server system 1100 records the sounds collected by the microphone 1512 of the user terminal 1500j as "live commentary sounds". The live commentary sound data generated along with the sound recording is recorded and managed as part of live commentary data 740 so that the data will be used as a material to be superimposed on the original sounds (game sounds) of the video as a target of live commentary addition.

When an avatar addition operation is input on the user terminal 1500j of the live commentary user 2j, the server system 1100 arranges, in the virtual three-dimensional space for monitor, a character object of an avatar 7 (one of live commentary objects, an object derived from the live commentary user that has not existed in the gameplay) that was registered in advance by the live commentary user 2j, and controls actions of the character object. The actions of the avatar 7 may be controlled by motion capture of images of the live commentary user 2j photographed by the user terminal 1500j or by selecting prepared actions by a command input. The data for controlling the actions of the avatar 7 is recorded and managed as part of the live commentary data 740.

When a comment addition operation is input on the user terminal 1500j of the live commentary user 2j, the server system 1100 performs a control to create and arrange a comment object 10 representing text, picture characters, images, or others indicative of an input comment (one of the live commentary objects, an object derived from the live commentary user that has not existed in the gameplay) in the virtual three-dimensional space for monitor.

The comment object 10 is designed as a "balloon" plate object, for example. In a case where the avatar 7 has been already arranged, the comment object 10 is arranged near above the head of the avatar 7 and is controlled as if the avatar 7 is floating. The comment object 10 is automatically controlled in posture such that the normal direction faces the virtual camera CM1 while wandering in moderation. The comment object 10 is erased after a lapse of a predetermined time after the arrangement. The data for implementing the control of arrangement of the comment object 10 is recorded and managed as part of the live commentary data 740. As a matter of course, the comment object 10 alone can be additionally arranged without arrangement of the avatar 7.

When a point-of-view addition operation is input on the user terminal 1500j of the live commentary user 2j, the server system 1100 arranges the additional camera CM1 as a new virtual camera in the virtual three-dimensional space and controls the additional camera CM1 based on an input of a given camerawork operation. The live commentary user 2j can set "camera switching" for selecting the virtual camera as to be a reference for generation of a monitor video image from between the original camera CM0 and the additional camera CM1. The data for controlling the operations of the additional camera CM1 and the data for implementing the camera switching are recorded and managed as part of the live commentary data 740.

When a replay speed change operation is input on the user terminal 1500j of the live commentary user 2j, the server system 1100 changes the direction and speed of temporal progress in the virtual three-dimensional space in accordance with the input of the operation. Accordingly, the live commentary user 2j changes the replay speed of part or all of the video as a target of live commentary addition to slow motion, frame-by-frame advance, fast forward, and fast rewind. The data for changing the replay speed (for example, from what timing to what timing the replay to be performed or at what speed the replay to be performed) is recorded and managed as part of the live commentary data 740.

When a replay operation is input on the user terminal 1500j of the live commentary user 2j, the server system 1100 causes the temporal progress in the virtual three-dimensional space to be partially repeated in accordance with the input of the operation. Accordingly, the live commentary user 2j can replay a part of the video as a target of live commentary addition. The control data of replay (for example, from what timing to what timing the replay to be performed and how many times the replay to be repeated) is recorded and managed as part of the live commentary data 740.

Figure 5:
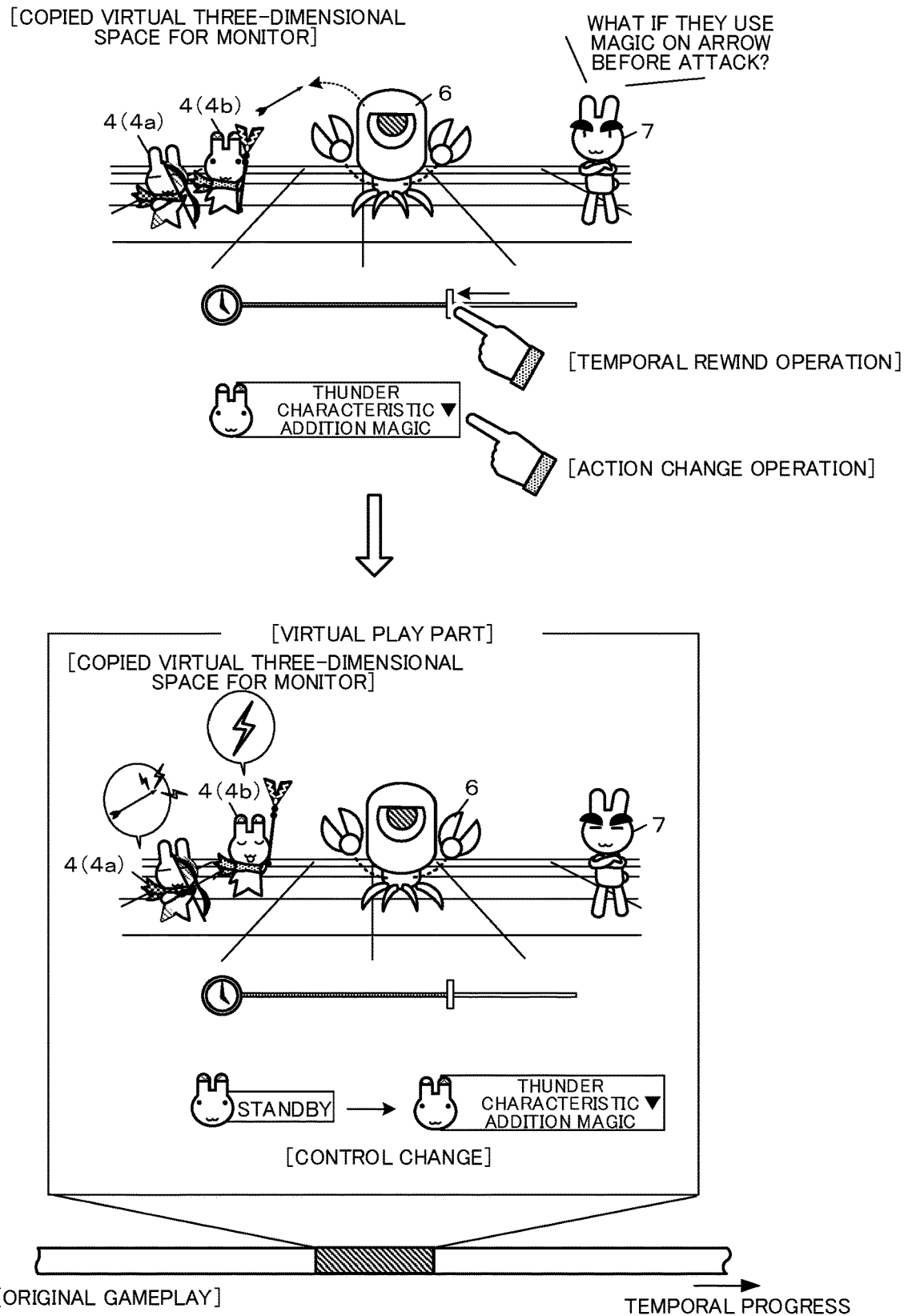
FIG. 5 is a diagram for describing addition of a new temporal progress and a new control related to live commentary addition.

FIG. 5 is a diagram for describing addition of a new temporal progress and a new control related to the live commentary addition. Upon detection of an input of a virtual play start operation on the user terminal 1500j of the live commentary user 2j, the server system 1100 starts to accept an input of a virtual play operation to a game object arranged in the virtual three-dimensional space for monitor.

The "virtual play" refers to virtually adding an input of an operation having not existed in the original gameplay to realize an "if" world in a live commentary video image, which is accompanied with addition of a new temporal progress and a new control that have not existed in the original gameplay. Specifically, the watching user first performs a temporal rewind operation to decide a timing at which to input a virtual play operation. When the temporal rewind operation is performed, the server system 1100 generates a copy of the virtual three-dimensional space for monitor and starts to generate a monitor video image. Then, the server system 1100 rewinds the temporal progress in the virtual three-dimensional space that has been copied in accordance with the operation.

The live commentary user 2j inputs a game object action change operation. The action change operation is a play operation input for constructing an "if" world, which offers the same options of operation inputs as those in the original gameplay. In the example of FIG. 5, the live commentary user 2j inputs a magic spell recitation operation for adding thunder characteristics to a weapon as the action change operation.

When the action change operation is input, the temporal progress is restarted from the time point of rewind and the operation input (action change operation) having not existed in the original gameplay is applied. The server system 1100 stops the control in execution in the original gameplay at the time point of rewind in the copied virtual three-dimensional space, and executes the control based on the action change operation instead. As a result, the "if" world the live commentary user 2j imagined is developed in the copied virtual three-dimensional space. When the live commentary video is overlooked, the replay of the live commentary video is temporarily stopped and the gameplay reproduced based on the virtual play is inserted into the live commentary video.

When the live commentary user 2j inputs a predetermined virtual play end operation, the server system 1100 discards the copied virtual three-dimensional space and returns to the generation of a video image based on the original virtual three-dimensional space for monitor. The data for implementing the control related to the virtual play operation is recorded and managed as part of the live commentary data 740.

Returning to FIG. 4, the server system 1100 records and manages information on the live commentary addition and the live commentary user 2j, for example, metadata such as the date and time of live commentary and the user account of the live commentary user as part of the live commentary data 740.

The live commentary data 740 generated by these live commentary additions is associated with the original data 710 of a video image as a target of live commentary addition and constitutes an element of modified reproduction data 760. In other words, the modified reproduction data 760 is a data group that is capable of reproducing a modified reproduction play in which a reproduction play reproduced as an original play video is modified, which includes data (first modified reproduction play) that is capable of reconstructing a virtual three-dimensional space in the gameplay to which the live commentary is added (first modified reproduction play).

Figure 6:
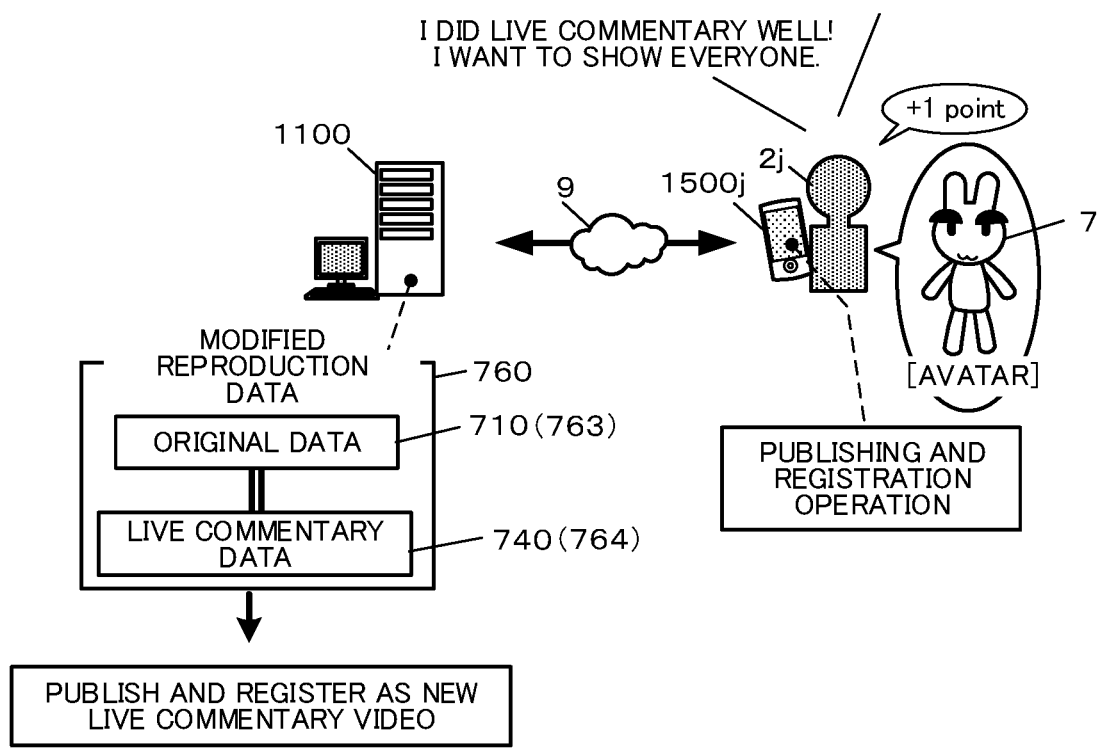
FIG. 6 is a diagram for describing publication and registration of a live commentary video.

FIG. 6 is a diagram for describing publication and registration of a live commentary video.

After the end of live commentary addition, if a predetermined publishing and registration operation is input on the user terminal 1500j, the server system 1100 prepares a virtual three-dimensional space for thumbnail generation, and reproduces the modified gameplay based on the modified reproduction data 760 to generate thumbnails of the live commentary video. Then, the server system 1100 publishes and registers the same as a new live commentary video.

When the live commentary video is published and registered, the thumbnails of the live commentary video, the contents of the metadata of the original data 710, and the contents of the metadata related to the live commentary addition in the live commentary data 740 are provided to the user who wishes to watch a video. The user selects or searches for a desired video using the provided data. As a watching user, the user 2 can watch the published original play video and the live commentary video (modified reproduction play video).

Figure 7:
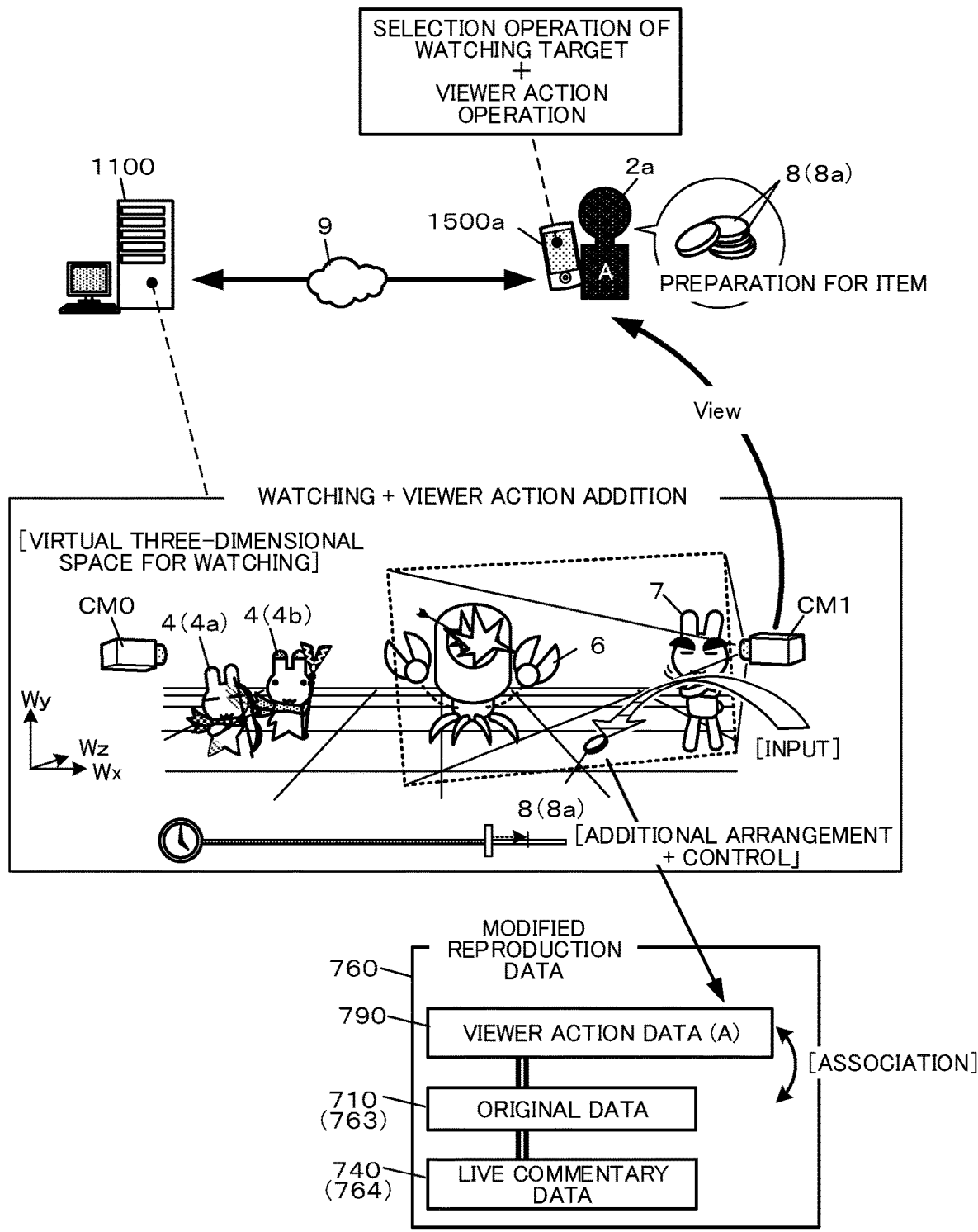
FIG. 7 is a diagram for describing watching of a published video (no. 1).

FIG. 7 is a diagram for describing watching of a published video. The watching user (the user 2a in the example of FIG. 7) uses the user terminal 1500 (the user terminal 1500a in the example of FIG. 7) to perform a predetermined watching request operation. Then, the user terminal 1500a of the watching user 2a transmits a predetermined watching request to the server system 1100. The server system 1100 starts to accept a selection operation of a video to be watched on the user terminal 1500a having made the request.

When the video to be watched (watching video) is selected, the server system 1100 prepares a virtual three-dimensional space for watching to generate the watching video, and arranges and controls object(s) and virtual camera(s) in the virtual three-dimensional space with reference to the modified reproduction data 760 of the watching video.

When the watching video is the original play video, the objects arranged in the virtual three-dimensional space for watching are only the game object and the virtual camera arranged in the virtual three-dimensional space for watching is only the original camera CM0. When the watching video is a live commentary video, the objects arranged are a game object and a live commentary object such as the avatar 7. In addition, the virtual cameras arranged are the original camera CM0 and an additional camera CM1.

As for the point of view as a reference for generating the watching video, when there is the additional camera CM1, the point of view of the additional camera CM1 is prioritized over the point of view of the original camera CM0. That is, when the watching video is a live commentary video, the images in the virtual three-dimensional space for watching viewed from a new point of view added by the live commentary addition are displayed on the user terminal 1500a of the watching user.

In a conventional live commentary video, the image of the avatar 7 would be composited with (laid on) the gameplay video like superimposition. In the conventional live commentary video, the gameplay video and the avatar 7 would appear to exist in clearly different worlds.

In the present embodiment, however, when the watching video is a live commentary video, the avatar 7 is added to the game world of the original gameplay. The difference in "sense of realism" felt by the watching user (the user 2a) between the conventional live commentary video and the live commentary video of the present embodiment is obvious so that the watching user (the user 2a) will feel a higher sense of sharing the game with the player and the live commentary user than ever before.

In addition, the live commentary video generated based on the newly added point of view (the additional camera CM1) is a video that takes over the contents of the original play video and has additional camerawork based on the live commentary user's opinion and production purpose. This enhances significance of the original play video as a secondary production. For the live commentary user, the creation range is more greatly widened than that in the generation of a conventional live commentary video. For the watching user as well, the same event can be seen from different points of view to increase the entertainment value of the video.

The watching user (the user 2a) can perform viewer actions in accordance with the watching of the video. The "viewer actions" are actions for reflecting the watching user's feelings about the contents of the watching video and transmitting the feelings to other watching users. For example, the viewer actions are actions for expressing sympathies, appraisal, protest, delight, anger, sorrow, and pleasure with the contents of the video.

In the present embodiment, the viewer actions include "social tipping". The "social tipping" is an action of expressing appraisal, sympathy, and backup. Specifically, the "social tipping" can also be said to be an action performed by the watching user (the user 2a) of transferring a social-tipping item 8 obtained in advance by online shopping or the like to persons concerned in the watching video (the player of the original play video or the live commentary user of the live commentary video).

When the watching user performs a predetermined social tipping operation input, the server system 1100 causes the object of the social-tipping item 8 as the target of the operation input (viewer action object, object derived from the watching user having not existed in the gameplay) to appear and move in the virtual three-dimensional space for watching. The object of the social-tipping item 8 is treated as if being input into the virtual three-dimensional space. The social-tipping item 8 having appeared stays in the virtual three-dimensional space for watching. When a predetermined disappearing condition (for example, a lapse of a predetermined time after the stoppage or a hit with another game object) is satisfied, the social-tipping item disappears and is transferred to a person concerned in the watching video. The data for implementing social tipping (for example, the type, number of inputs, input position, input direction, and input force of the specified social-tipping item 8) is included and stored in viewer action data 790.

The viewer actions include posting of a comment. Comment may be posted by text or sound. In a case of posting a comment by text, a live commentary object for displaying comment text (comment object) is newly added and data for implementing the live commentary object (for example, the type of the live commentary object, comment text, appearance position, movement route, and others) is included and stored in the viewer action data 790. In a case of posting a comment by sound, sound data of the comment is included and stored in the viewer action data 790.

The viewer action may include a new point of view (a new additional camera). In that case, information for adding a new point of view (in that case, arrangement position, posture, setting of a field of view for image shooting, setting of a filter, movement pattern after arrangement, and others) is included and stored in the viewer action data 790.

The viewer action data 790 is associated with the original data 710 of the watching video and thereafter constitutes part of the modified reproduction data 760 of the watching video. Accordingly, the modified reproduction data 760 of the watching video has been modified along with the watching. Thus, the modified reproduction data 760 having been further modified along with the watching becomes data (second modified reproduction data) that is capable of reconstructing a virtual three-dimensional space in the gameplay to which the viewer object is added (second modified reproduction play).

Figure 8:
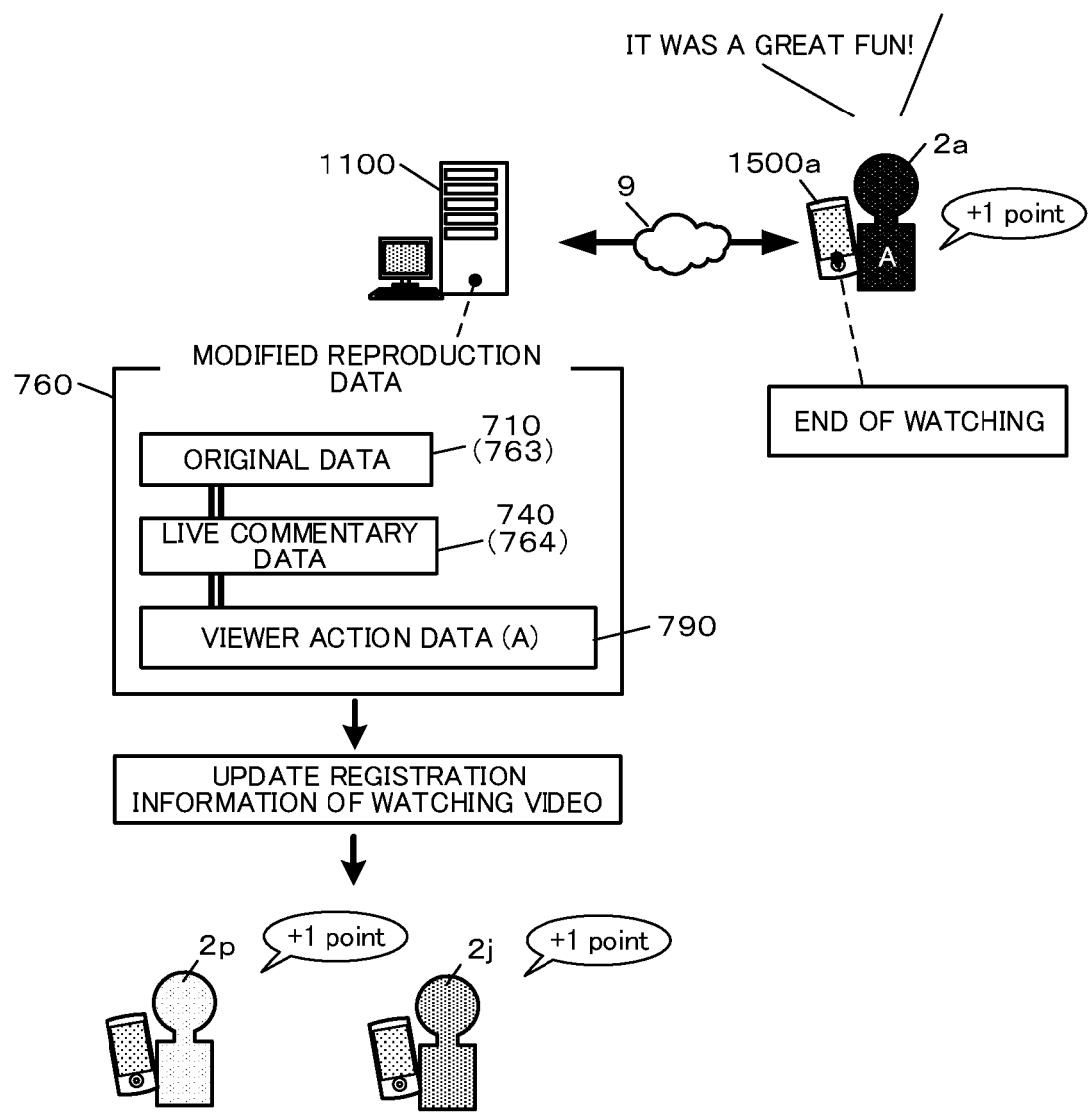
FIG. 8 is a diagram for describing a process after video watching (no. 1).

FIG. 8 is a diagram for describing a process after video watching. Upon completion of watching of the video, the server system 1100 prepares a virtual three-dimensional space for thumbnail updating and reproduces the modified gameplay to generate a watching video and thumbnails based on the modified reproduction data 760 as a result of the modification this time, thereby to update the registration information of the watching video.

Then, the server system 1100 gives a user point to the watching user (the user 2a) and persons concerned in the watching video. The "user point" is a point that is set and managed for each of the registered users in the play data community system 1000. The user point is used for determining the giving of reward or the like.

As described above, the results of live commentary addition to the original play video by the live commentary user and the viewer actions by the watching user are reflected in any of forms such as addition of a new object, addition of a new point of view, and addition of a new sound to the virtual three-dimensional space for watching.

Figure 9:
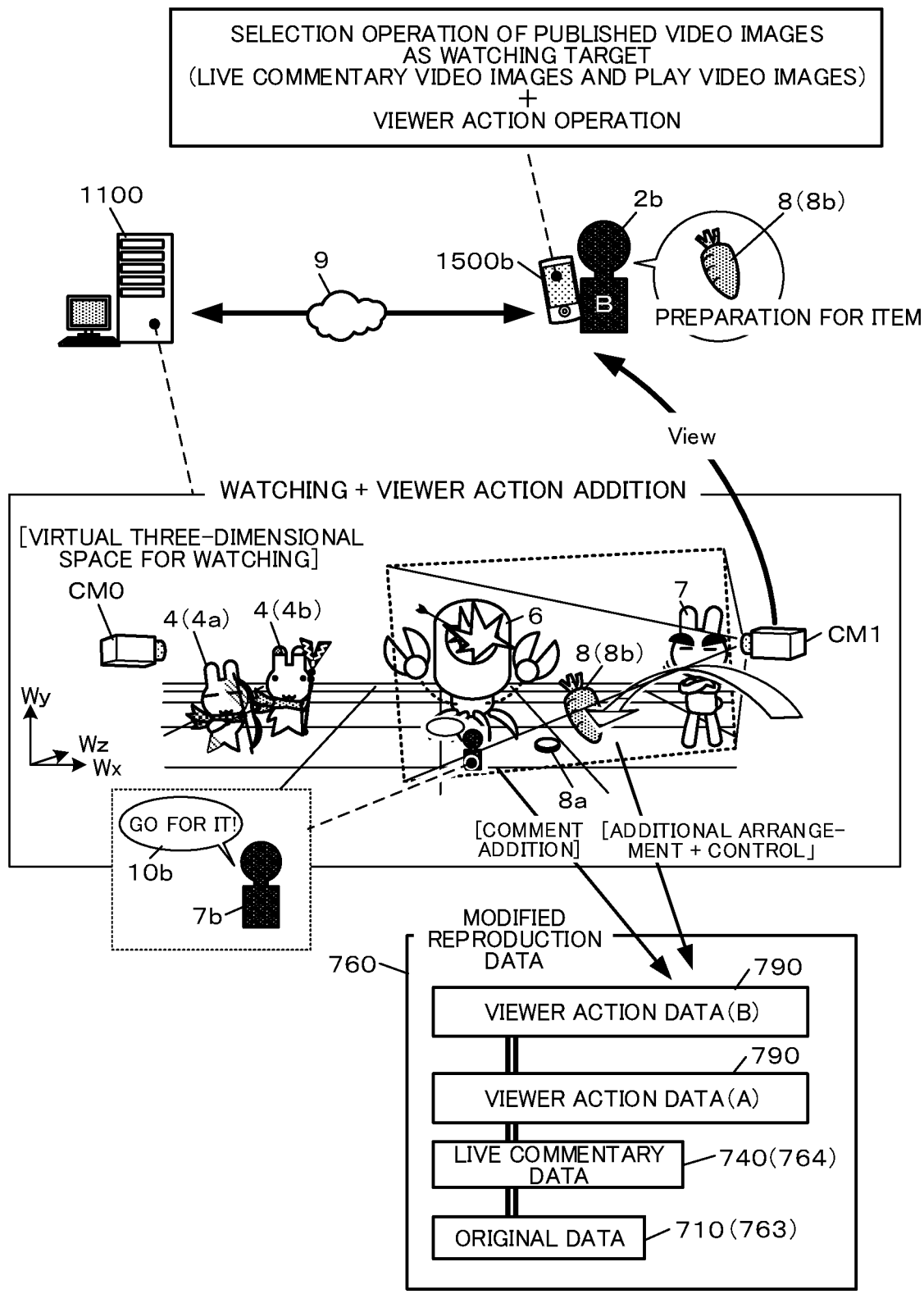
FIG. 9 is a diagram for describing watching of a published video (no. 2).

FIG. 9 illustrates a case where another watching user (the user 2b) watches the video that has been watched by the watching user (the user 2a) illustrated in FIG. 7 (before the disappearance of the social-tipping item) and performs a viewer action. At the point of time when the other watching user (the user 2b) selects a video to watch, the modified reproduction data 760 having been modified along with the watching by the watching user (the user 2a) illustrated in FIG. 7 includes the viewer action data 790 having been generated along with the watching by the watching user (the user 2a).

Accordingly, the avatar 7 is arranged and the viewer action object (the social-tipping item 8 (8a)) based on the viewer action data 790 is left in the virtual three-dimensional space for watching that is prepared for generating a video to be watched by the other watching user (the user 2b).

In a conventional live commentary video, the image of the social-tipping item is composited with (laid on) the gameplay video and is handled as mere a kind of superimposition. In the present embodiment, however, when the watching video is a live commentary video, the social-tipping item 8 (8a) having not existed in the original gameplay exists in the world in which the gameplay is reproduced. The difference in "sense of realism" felt by the watching user between the conventional live commentary video and the live commentary video of the present embodiment is obvious so that the other watching user (the user 2*b*) will feel a higher sense of sharing the game with the previous watching user (the user 2*a*), the player, and the live commentary user.

In addition, as a matter of course, the other watching user (user 2*b*) himself/herself can perform a viewer action. In the example of FIG. 9, the social-tipping item 8 (8*b*) of carrot is specified and tipped as a first viewer action. The object of carrot (viewer action object) is also caused to appear and move in the virtual three-dimensional space for watching as if being input from the outside. The data for implementing the appearance and movement is recorded as new viewer action data 790. Then, the new viewer action data 790 is associated with the original data 710 of the watching video. Accordingly, the modified reproduction data 760 of the watching video is modified and the new viewer action data 790 constitutes part of the watching video.

In the example of FIG. 9, the other watching user (the user 2*b*) posts a comment as a second viewer action. The comment is displayed as a comment object 10*b* together with an avatar 7*b* of the watching user. The comment object 10*b* of the watching user is controlled like the comment object 10 of the live commentary user (see FIG. 4). The avatar 7*b* may not be additionally arranged but only the comment object 10*b* may be additionally arranged.

Figure 10:
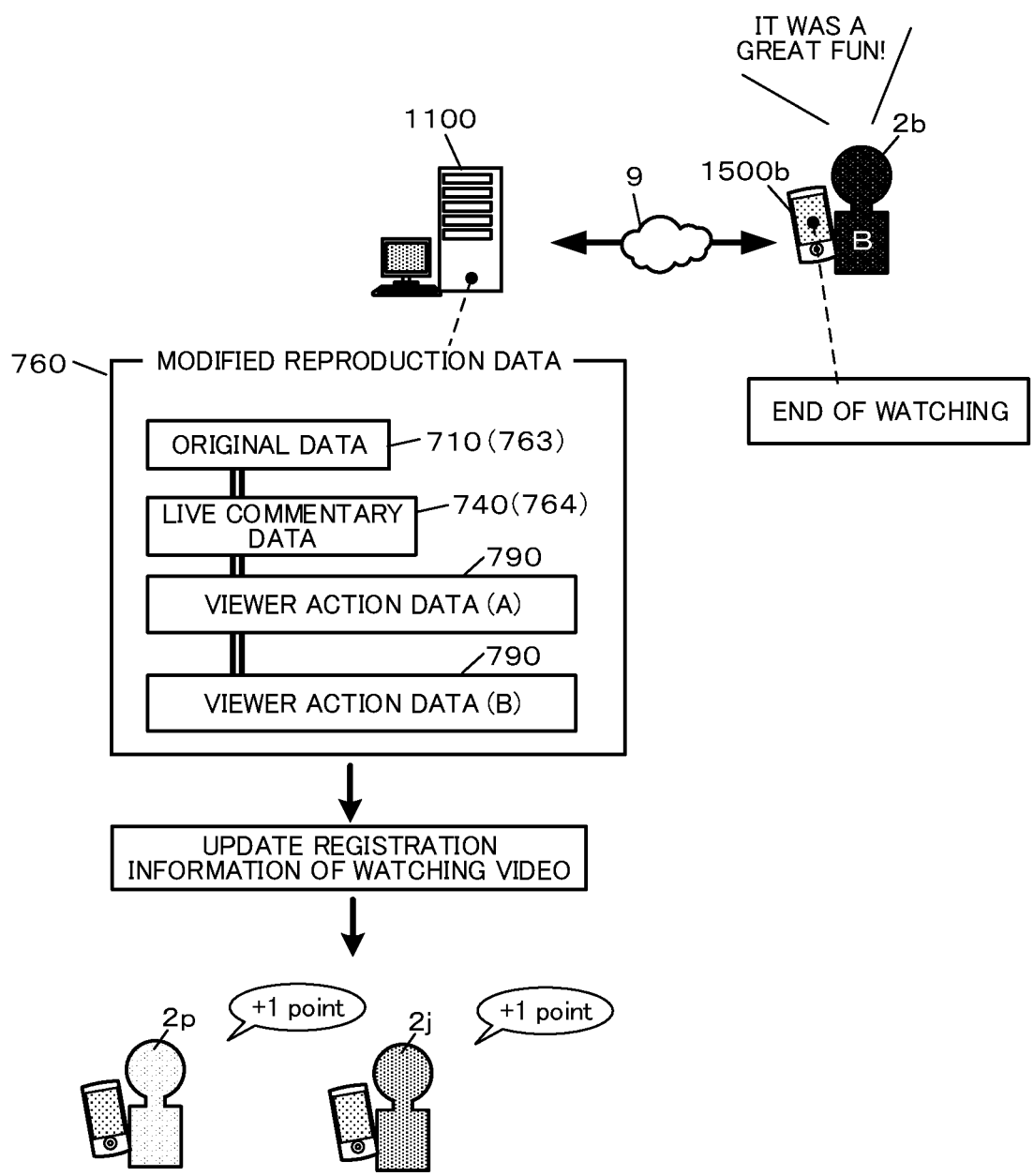
FIG. 10 is a diagram for describing a process after video watching (no. 2).

When the other watching user (the user 2*b*) ends watching, the server system 1100 prepares a virtual three-dimensional space for thumbnail updating, and reproduces the gameplay modified based on the modified reproduction data 760 as a result of modification this time to generate a video as illustrated in FIG. 10. Then, the server system 1100 generates thumbnails from the data to update the registration information of the watching video. The server system 1100 gives a user point to the other watching user (the user 2*b*) and persons concerned in the watching video.

In this manner, the influences of the addition of live commentary by the live commentary user and the watching action by the watching user are accommodated in the published original play video. When different live commentary users add their respective live commentary to the same original play video, the original play video is registered as separate live commentary videos in the form of publishing and registration. However, their respective live commentary data 740 are associated with the original data 710 of the original play video and are managed in a state capable of reference at any time. This means that options about how to enjoy an original play video as one material can be increased more and more. In other words, various versions of the original play video as one material can be watched.

In the present embodiment, the user terminal 1500 of the watching user allows selection of the version of a video to be watched before start of watching.

Figure 11:
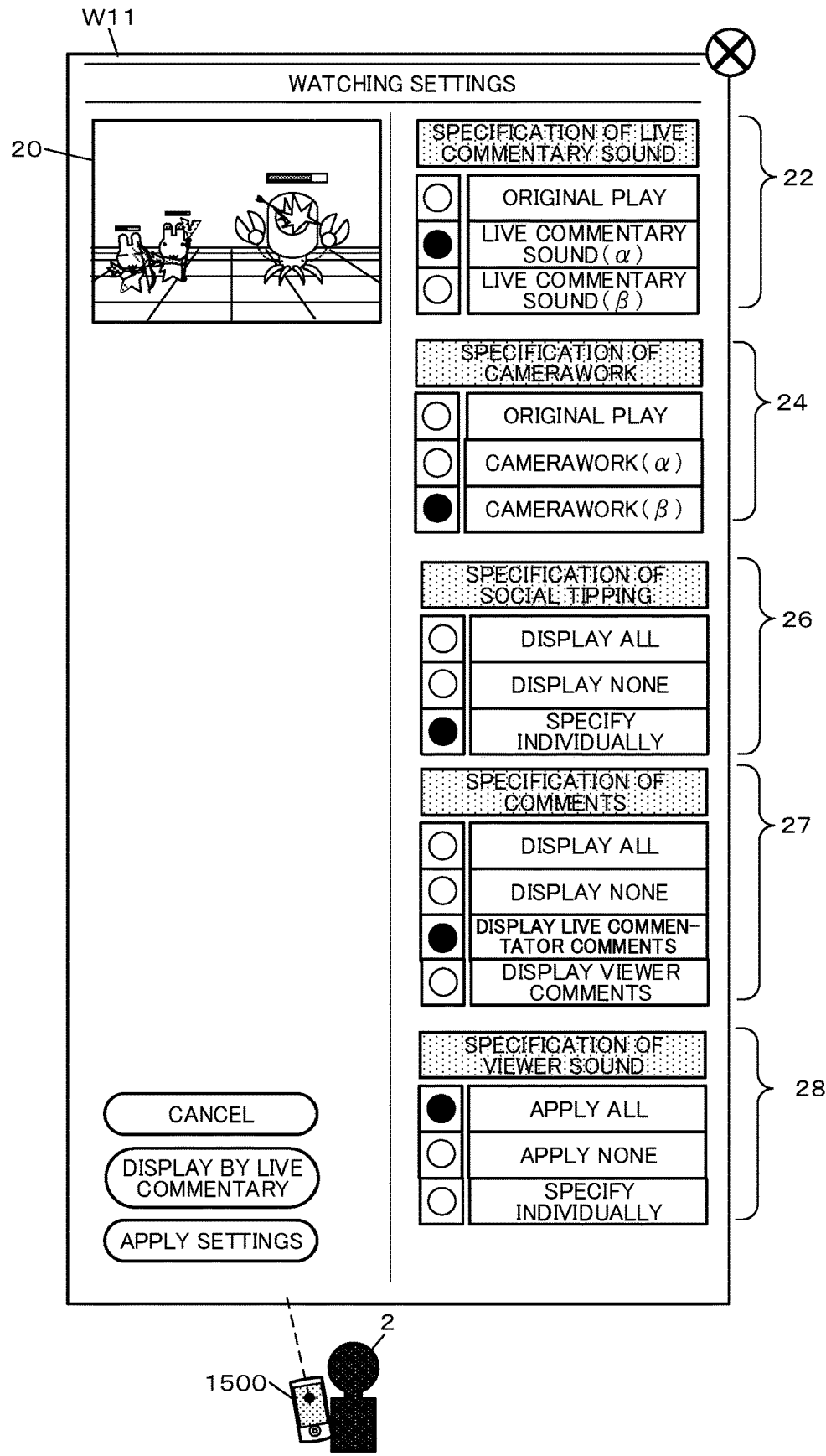
FIG. 11 is a diagram illustrating an example of a watching setting screen.

Specifically, by default, the gameplay of the video selected as a watching target (the original play video or the live commentary video) is reproduced and displayed as a watching video on the user terminal 1500 of the watching user. However, when a predetermined watching setting start operation is input on the user terminal 1500 of the watching user, a watching setting screen W11 is displayed as shown in FIG. 11 so that the user can specify the live commentary sound, camerawork, and viewer action that are to be applied to the reproduction play of the watching video.

The watching setting screen W11 includes a thumbnail image 20, a sound specification part 22, a camerawork specification part 24, a first viewer action specification part 26, and a second viewer action specification part 27.

Upon detection of a predetermined watching setting start operation on the user terminal 1500 of the watching user, the server system 1100 presents live commentary sounds for each of the live commentary data 740 in the modified reproduction data 760 of the watching video as user-selectable options on the sound specification part 22. The options are preferably displayed together with account names of the live commentary users included in the metadata of the live commentary data 740.

Similarly, the server system 1100 presents user selectable options for each of the live commentary data 740 on the camerawork specification part 24.

Similarly, the server system 1100 presents user-selectable options related to display of the social-tipping item 8 (see FIGS. 7 and 9) for each of the viewer action data 790 in the modified reproduction data 760 on the first viewer action specification part 26. The server system 1100 presents user-selectable options related to display of the comment object 10 (see FIGS. 4 and 9) by the watching user for each of the viewer action data 790 in the modified reproduction data 760 on the second viewer action specification part 27. The server system 1100 presents user-selectable options of sound of the watching user to be superimposed for each of the viewer action data 790 of the modified reproduction data 760 on a third viewer action specification part 28.

When the watching user performs a specification operation on any of these specification parts to input a predetermined applied operation, the server system 1100 arranges and controls the avatar 7 and the additional camera in the virtual three-dimensional space for watching based on the live commentary data 740 corresponding to the selection on the camerawork specification part 24. The server system 1100 performs a control to superimpose the live commentary sound of the live commentary data 740 corresponding to the selection on the sound specification part 22, on the sound in the original gameplay. Out of the viewer action data 790 corresponding to the selection on the first viewer action specification part 26, the server system 1100 arranges and controls the viewer action object related to social tipping in the virtual three-dimensional space for watching, and arranges and controls the comment object 10 of the viewer corresponding to the selection on the second viewer action specification part 27 in the virtual three-dimensional space for watching. The server system 1100 performs a control to superimpose the sound of the watching user corresponding to the selection on the third viewer action specification part 28.

In addition, as described above, each time the live commentary user adds live commentary, a new live commentary object of the avatar 7 is added to the game object constituting the original gameplay, and each time the watching user performs a viewer action, a new viewer action object is added to the game object constituting the original gameplay. Thus, taking advantage of the addition of new objects, in the present embodiment, the server system 1100 performs an automatic control of reaction to further enhance a sense of realism.

Figure 12:
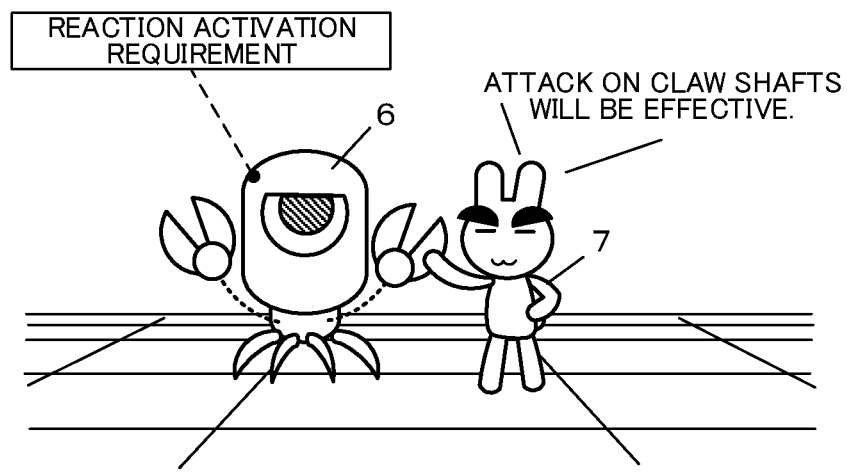
FIG. 12 is a diagram for describing automatic control of reaction of a game object.
Figure 12:
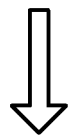
Figure 12:
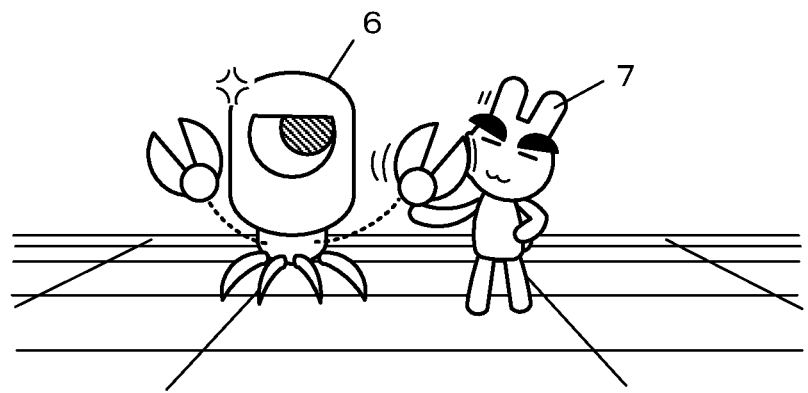

FIG. 12 is a diagram for describing automatic control of reaction of a game object. The game object (the object of the enemy character 6 in the example of FIG. 12) is set with a reaction activation requirement describing a requirement for activating each reaction. When the requirement is satisfied, the server system 1100 causes automatic execution of a predetermined reaction associated with the satisfied requirement in the virtual three-dimensional space for monitor and the virtual three-dimensional space for watching.

In the example of FIG. 12, the enemy character 6 and the avatar 7 as the live commentary user are present in the game. The avatar 7 is making mention of a weak point in the enemy character by live commentary sound. The enemy character 6 is set with reaction activation requirements that "the avatar 7 is present in a predetermined range" and "spoken words indicating the weak point are recognized". Accordingly, when the live commentary user makes mention of the weak point in the proximity of the avatar 7, the server system 1100 automatically causes the enemy character 6 to show a reaction meaning "shut up" to the avatar 7.

In this way, setting and execution of reactions makes it possible to not only add a live commentary object having not existed in the original gameplay but also add interaction between the game object and the live commentary object, in the form of the game object's action that has not been implemented in the original gameplay. Thus, the live commentary user and the watching user can feel a sense of realism as if they are present in the site of the game space where the player played the game.

As a matter of course, the game object's reaction to the live commentary object, in other words, the interaction between the game object and the live commentary object is not limited to the example of FIG. 12. For example, if the watching user can add a floating live commentary object clearly showing a place to be noted (for example, an arrow object or a circle object) in a virtual three-dimensional space, it is possible to set the game object's reaction with the arrow object or the circle object as if there a reactive force caused by contact between the game object and the arrow object or the circle object that is a reaction activation requirement.

Figure 13:
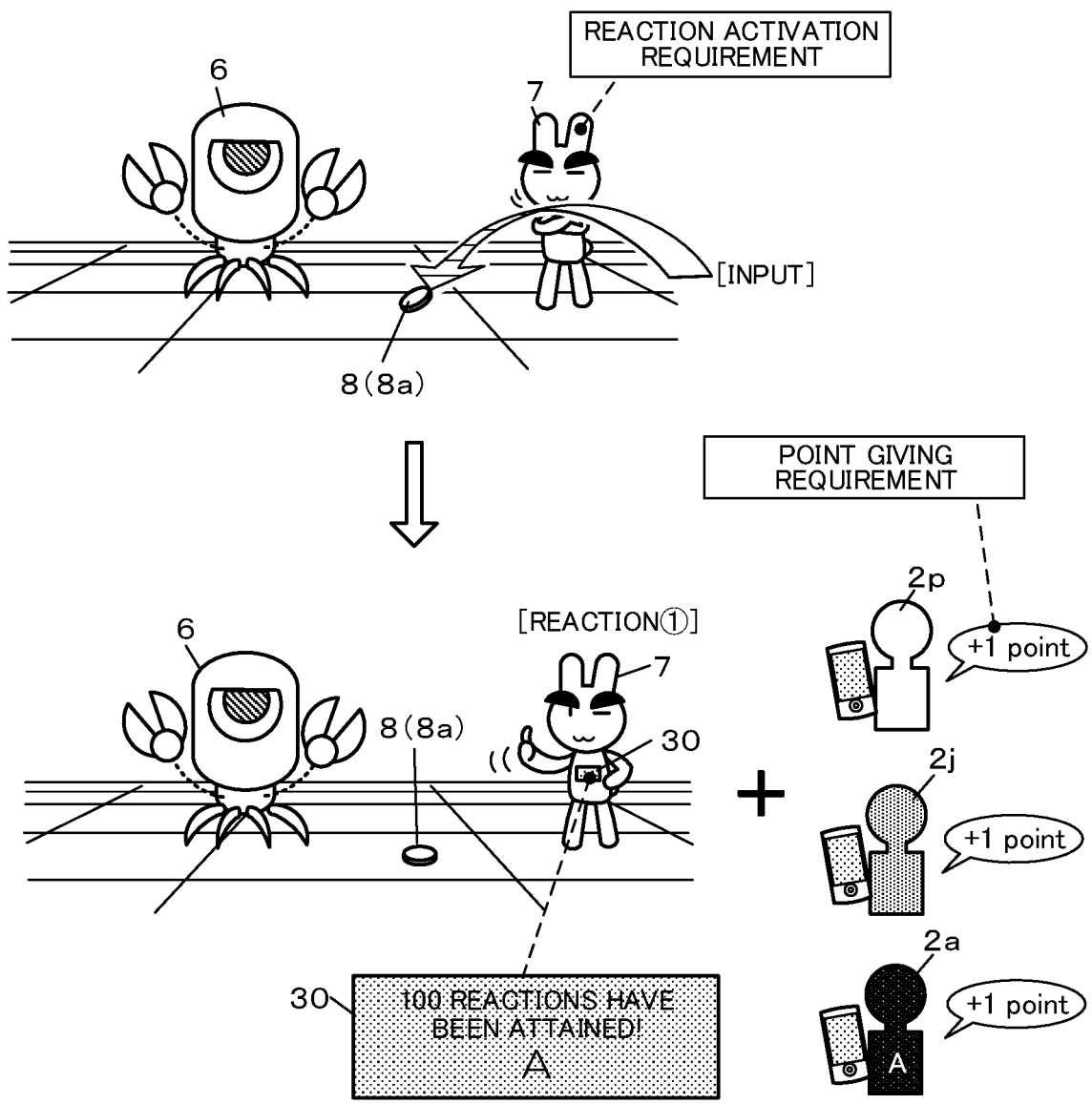
FIG. 13 is a diagram for describing automatic control of a reaction with a live commentary object.

FIG. 13 is a diagram for describing automatic control of a reaction with a live commentary object. The live commentary object (the avatar 7 in the example of FIG. 13) is set with a reaction activation requirement describing a requirement for activating each reaction. When the requirement is satisfied, the server system 1100 causes automatic execution of a predetermined reaction associated with the satisfied requirement.

In the example of FIG. 13, the avatar 7 is set with reaction activation requirements that "a predetermined type of social-tipping item 8 is newly added" and "the social-tipping item 8 approaches in a predetermined range". The reactions to be activated are to recognize the social tipping and appreciate the social tipping to the watching user having done the social tipping.

In the present embodiment, as some of the reactions, the watching user information is reflected on the user point and the reproduced gameplay to allow the watching user to more clearly feel that the watching user's action has influence on not only the reproduced gameplay but also other users concerned in the watching video.

Specifically, point giving requirements related to the viewer actions and the points to be given when the requirements are satisfied are preset. Examples of the "point giving requirements" include social tipping, the total number of times when social tipping was performed by the watching user during watching this time, social tipping of a special type of social-tipping item 8, and others. Then, the server system 1100 gives the user point preset corresponding to the satisfied point giving requirement to the users concerned in the watching video (the player (the user 2*p*), the live commentary user (the user 2*j*), and the watching user (the user 2*a*) in the example of FIG. 13). As a matter of course, the concerned user to be given the user point can be set as appropriate.

In addition, viewer name display requirements related to viewer actions are preset. The "viewer name display requirement" can be set based on, for example, the total number of times when social tipping was performed by the watching user during watching this time, the total number of times when social tipping was performed by the watching user from the past to this time, the total number of social tipping to this watching video, the frequency of social tipping, the total amount of social tipping, and others. When the viewer name display requirement is satisfied, the server system 1100 displays the account name of the watching user in the reproduced gameplay. In the present embodiment, the avatar 7 is accompanied with a display object 30 representing the account name. Alternatively, text of the account name may be composited with and applied to an outer appearance texture of the avatar 7.

Next, a functional configuration of the play data community system 1000 will be described.

Figure 14:
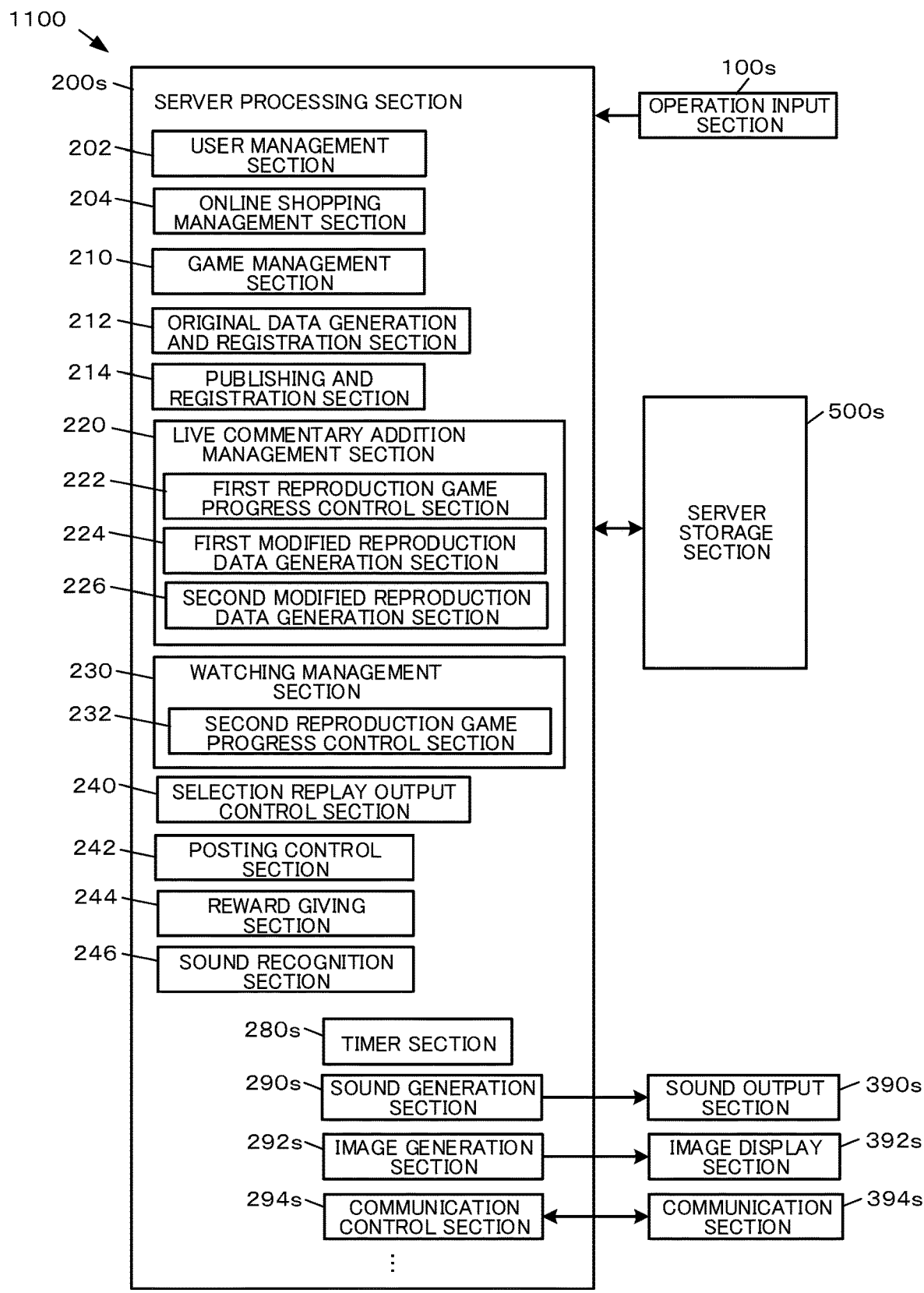
FIG. 14 is a functional block diagram illustrating a functional configuration example of a server system according to a first embodiment.

FIG. 14 is a functional block diagram illustrating a functional configuration example of the server system 1100.

The server system 1100 includes an operation input section 100*s*, a server processing section 200*s*, a sound output section 390*s*, an image display section 392*s*, a communication section 394*s*, and a server storage section 500*s*.

The operation input section 100*s* is a means for inputting various operations for server management. The operation input section 100*s* corresponds to the keyboard 1106 illustrated in FIG. 1.

The server processing section 200*s* is implemented by a processor that is a calculation circuit such as a CPU, a GPU, an ASIC, or an FPGA and electronic parts such as an IC memory. The server processing section 200*s* controls input and output of data between functional sections including the operation input section 100*s* and the server storage section 500*s*. In addition, the server processing section 200*s* performs various calculation processes based on predetermined programs, data, operation input signals from the operation input section 100*s*, data received from the user terminal 1500, and the like, thereby to entirely control the operations of the server system 1100.

The server processing section 200*s* includes a user management section 202, an online shopping management section 204, a game management section 210, an original data generation and registration section 212, a publishing and registration section 214, a live commentary addition management section 220, a watching management section 230, a selection replay output control section 240, a posting control section 242, a reward giving section 244, a sound recognition section 246, a timer section 280*s*, a sound generation section 290*s*, an image generation section 292*s*, and a communication control section 294*s*. Note that functional sections other than these may be included as appropriate.

The user management section 202 performs a process related to a user registration procedure and manages the data of each user associated with a user account. In the present embodiment, the user management section 202 has the functions of: 1) assignment of unique user accounts to registered users; 2) registration information management to register and manage personal information (for example, account name) by user account; 3) accounting of electronic payment media spent at payment for billing elements (online shopping and gameplay cost in the present embodiment); 4)

play history management for managing the history of login and logout in gameplay; and 5) management of game save data. Note that any other management function for other data associated with the account can be included as appropriate.

The online shopping management section 204 is in charge of control related to online shopping. The online shopping management section 204 can be implemented as appropriate with a known online shopping technique. In the present embodiment, the player can purchase the player character 4 and various items (the social-tipping item 8 and others) through online shopping. Any other elements may be set as appropriate to be purchased through the online shopping.

The game management section 210 performs various processes related to game execution management. The game according to the present embodiment is implemented as a client-server online game. Thus, the game management section 210 communicates with the user terminal 1500 to perform a control to provide data required for gameplay. The game management section 210 manages the play data 700.

The original data generation and registration section 212 generates the original data 710 (see FIG. 3) based on the data of the gameplay on the user terminal 1500 and causes the same to be stored in the server storage section 500s (original data storage means).

The publishing and registration section 214 performs a control to register a video in such a manner as to be watchable for the registered users. The publishing and registration section 214 also generates thumbnails of a video to be registered.

The live commentary addition management section 220 performs a control related to live commentary addition (see FIG. 4). The live commentary addition management section 220 has a first reproduction game progress control section 222, and serves as a first modified reproduction data generation section 224 and a second modified reproduction data generation section 226.

The first reproduction game progress control section 222 performs a game progress control to replay the reproduction play along with live commentary addition. In general, the live commentary video is generated based on an original play video. Thus, in a case where the video as a target of live commentary addition is the original play video, the first reproduction game progress control section 222 arranges and controls objects and virtual cameras in the virtual three-dimensional space for monitor based on the original data 710 and performs a control related to generation of a monitor video image.

Then, the first reproduction game progress control section 222 performs an automatic control of a computer-controlled object in the reproduction play. This is an automatic control of a non-playable character (NPC). In the present embodiment, the first reproduction game progress control section 222 corresponds to the automatic control of the enemy character 6 based on the original gameplay. In addition, a control of the NPC's reaction is also applied (see FIGS. 12 and 13).

In accordance with the live commentary addition operation, the live commentary addition management section 220 generates the live commentary data 740 and generates the modified reproduction data 760 for reproducing the live commentary video. At that time, when the target of live commentary addition is the original play video, the live commentary addition management section 220 serves as the first modified reproduction data generation section 224.

The first modified reproduction data generation section 224 performs: 1) a first terminal replay output control to reproduce the original gameplay based on the original data 710 to replay and output from the first user terminal (in this case, the user terminal of the live commentary user); and 2) at least one of a first object appearance control to cause a first object having not existed in the original gameplay (in this case, the live commentary object) to appear in accordance with an operation input on the first user terminal, a first comment object appearance control to cause a first comment object to appear in accordance with an operation input on the first user terminal, a first sound superimposition control to superimpose a first sound (in this case, the live commentary sound) input from the first user terminal on the original gameplay, and a first point-of-view setting control to set a first point of view (in this case, the additional camera CM1) as a reference of image generation in accordance with an operation input on the first user terminal, thereby to generate the first modified reproduction data (the modified reproduction data 760) that is capable of reproducing the first modified reproduction play in which the reproduction play of the original gameplay is modified.

The first modified reproduction data generation section 224 also sets a replay speed in accordance with an operation input on the first user terminal in the first terminal replay output control, and generates the first modified reproduction data including the setting of the replay speed.

The first modified reproduction data generation section 224 also sets a replay in accordance with an operation input on the first user terminal in the first terminal replay output control, and generates the first modified reproduction data including the setting of the replay.

The first modified reproduction data generation section 224 also causes the first reproduction game progress control section 222 to replay the reproduction play with an adaptation set in accordance with an operation input on the first user terminal in the first terminal replay output control, and generates the first modified reproduction data including the setting of the adaptation. Specifically, the first modified reproduction data generation section 224 sets an adaptation that has an influence on the computer-controlled object automatically controlled in the reproduction play in accordance with an operation input on the first user terminal.

The adaptation corresponds to the reproduction control of the "if" gameplay by the "virtual play" in the present embodiment (see FIG. 5). In addition, controls caused by execution of reactions, which have not existed in the original gameplay, also correspond to the adaptation (see FIGS. 12 and 13).

The first modified reproduction data generation section 224 performs a control to cause the first comment object to appear in accordance with an operation input on the first user terminal.

At the time of generation of the modified reproduction data 760, in a case where the video is obtained by modifying the original play video (for example, the live commentary video or the live commentary video to which a live commentator object is added), the live commentary addition management section 220 serves as the second modified reproduction data generation section 226.

The second modified reproduction data generation section 226 performs: a) a second terminal replay output control to reproduce the first modified reproduction play based on the first modified reproduction data to replay and output from a second user terminal (for example, the user terminal of the live commentary user who wishes to add live commentary to the live commentary video); and b) at least one of a second object appearance control to cause a second object having not existed in the first modified reproduction play (for example, a new live commentary object having not appeared in the live commentary video as a live commentary addition target) to appear in accordance with an operation input on the second user terminal, a second comment object appearance control to cause a second comment object to appear in accordance with an operation input on the second user terminal, a second sound superimposition control to superimpose a second sound (for example, the sound of a comment to the live commentary video as a live commentary addition target) input from the second user terminal on the first modified reproduction play, and a second point-of-view setting control to set a second point of view (for example, a new additional camera having not existed in the live commentary video as a live commentary addition target) as a reference of image generation in accordance with an operation input on the second user terminal, thereby to generate the second modified reproduction data that is capable of reproducing a second modified reproduction play in which the first modified reproduction play is modified.

The second modified reproduction data generation section 226 sets the replay speed in accordance with an operation input on the second user terminal in the second terminal replay output control, and generates the second modified reproduction data including the setting of the replay speed.

The second modified reproduction data generation section 226 sets a replay in accordance with an operation input on the second user terminal in the second terminal replay output control, and generates the second modified reproduction data including the setting of the replay.

The second modified reproduction data generation section 226 causes the first reproduction game progress control section 222 to replay the reproduction play with the setting of the adaptation in accordance with an operation input on the second user terminal in the second terminal replay output control, and generates the second modified reproduction data including the setting of the adaptation. Specifically, the second modified reproduction data generation section 226 sets the adaptation that has an influence on the computer-controlled object automatically controlled in the reproduction play in accordance with an operation input on the second user terminal.

The second modified reproduction data generation section 226 performs a control to cause the second comment object to appear in accordance with an operation input on the second user terminal.

The watching management section 230 performs a control to allow a video published to the registered users to be watched on the user terminal 1500 (see FIGS. 7 and 9). The watching management section 230 has a second reproduction game progress control section 232.

The second reproduction game progress control section 232 performs a game progress control to replay the reproduction play of the watching video. In general, when the watching video is the original play video, the second reproduction game progress control section 232 arranges and controls a game object and an original camera in the virtual three-dimensional space for watching based on the original data 710 and performs a control related to generation of a video image for watching. When the watching video is the live commentary video, the second reproduction game progress control section 232 arranges and controls the game object, the live commentary object, the original camera CM0, and the additional camera CM1 in the virtual three-dimensional space for watching based on the modified reproduction data 760, and performs a control related to generation of a video image for watching.

The watching management section 230 generates the viewer action data 790 in accordance with a viewer action operation, and generates the modified reproduction data 760 for reproducing the gameplay in which the viewer action is added to the video to be watched (see FIGS. 7 and 9).

The selection replay output control section 240 presents the gameplay, the first modified reproduction play, and the second modified reproduction play in a selectable manner on a third user terminal (in this case, the user terminal of the watching user), and performs a control to reproduce the play, thereby causing the play to be replayed and output from the third user terminal. In the present embodiment, this control corresponds to a display control of a watching setting screen W11 (see FIG. 11), arrangement and control of objects and virtual cameras in the virtual three-dimensional space for watching in accordance with a selection operation by the watching user on the selection screen, and a sound superimposition control in accordance with a selection operation by the watching user on the selection screen.

That is, in a case of causing the original gameplay to be replayed and output from the third user terminal by default, the selection replay output control section 240 causes a video image of the gameplay viewed from the original point of view to be output from the third user terminal, in a case of causing the first modified reproduction play to be replayed and output from the third user terminal, the selection replay output control section 240 causes a video image of the first modified reproduction play viewed from the first point of view to be output from the third user terminal, and in a case of causing the second modified reproduction play to be output from the third user terminal, the selection replay output control section 240 causes video images of the second modified reproduction play viewed from the second point of view to be output from the third user terminal.

When detecting an input of a predetermined watching setting start operation on the user terminal 1500 of the watching user, the selection replay output control section 240 presents the original point of view, the first point of view, and the second point of view on the third user terminal in a selectable manner and performs a control to cause a video image of the selected play viewed from the selected point of view to be output from the third user terminal.

When detecting an input of the watching setting start operation, the selection replay output control section 240 presents the first sound and the second sound on the third user terminal in a selectable manner, and performs a control to cause the sound for reproduction of the selected play to be output as a selected sound from the third user terminal.

The selection replay output control section 240 presents the first comment object and the second comment object on the third user terminal in a selectable manner, and performs a control to cause the comment object selected by the selection operation on the third user terminal to appear at the time of reproduction of the selected play.

The posting control section 242 performs a control to automatically post a video of reproducing the first modified reproduction play based on the first modified reproduction data and/or a video of reproducing the second modified reproduction play based on the second modified reproduction data to a predetermined video site.

The reward giving section 244 changes a parameter value set to a user along with at least generation of the modified reproduction data 760 ("user point" in the present embodiment), and gives a given reward to the user based on the parameter value.

The sound recognition section 246 executes a sound recognition process and outputs information of recognized words. In the present embodiment, the information is used for sound recognition of live commentary sounds.

The timer section 280s uses a system clock to measure the current date and time, the limited time period, and others.

The sound generation section 290s is implemented by execution of an IC or software for generating sound data and decoding, and generates or decodes sound data of operational sounds related to system management of the server system 1100, gameplay, live commentary addition, and video watching, and BGMs. The sound generation section 290s executes a sound superimposition control to superimpose and composite a plurality of sounds. Sound signals related to system management are output to the sound output section 390s.

The sound output section 390s emits sound in accordance with input sound signals. In the example of FIG. 1, the sound output section 390s corresponds to a speaker (not illustrated) included in the main body device or the touch panel 1108.

The image generation section 292s generates images, composites images, and outputs image signals to be displayed to the image display section 392s. In the present embodiment, the image generation section 292s is in charge of some of the functions to generate various still images and video images such as images related to the system management of the server system 1100 and game images (or data for displaying the game images on the user terminal 1500). For example, the image generation section 292s performs rendering of images captured by virtual cameras arranged in the virtual three-dimensional space.

The communication control section 294s performs a data process related to data communication, and implements exchange of data with an external device through the communication section 394s.

The communication section 394s connects to the network 9 to implement communications. For example, the communication section 394s is implemented by a transceiver, a modem, a terminal adaptor (TA), a jack for wired communication cable, a control circuit, and the like. In the example of FIG. 1, the communication section 394s corresponds to the communication device 1153.

The server storage section 500s stores programs for implementing various functions for causing the server processing section 200s to comprehensively control the server system 1100, various kinds of data, and the like. The server storage section 500s is used as a work area for the server processing section 200s, and temporarily stores results of calculations executed by the server processing section 200s in accordance with various programs. This function is implemented by an IC memory such as a RAM or a ROM, a magnetic disc such as a hard disc, an optical disc such as a CD-ROM or a DVD, an online storage, and the like. In the example of FIG. 1, this function corresponds to the storage media such as the IC memory 1152 and the hard disc included in the main body device and the storage 1140.

Figure 15:
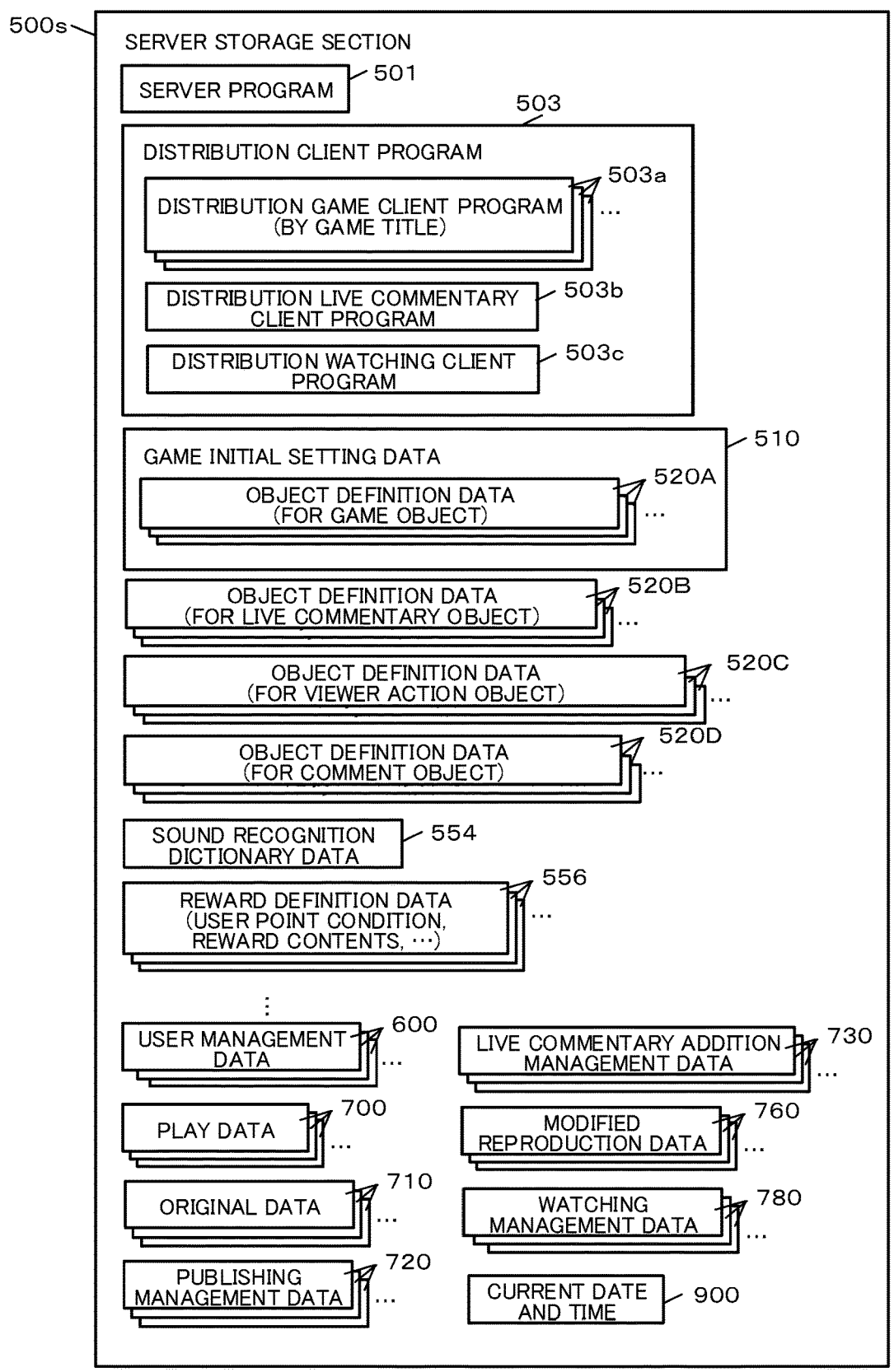
FIG. 15 is a diagram illustrating an example of programs and data stored in a server storage section according to the first embodiment.

FIG. 15 is a diagram illustrating an example of programs and data stored in the server storage section 500s in the present embodiment. The server storage section 500s in the present embodiment stores a server program 501, a distribution client program 503, game initial setting data 510, object definition data for live commentary object 520B, object definition data for viewer action object 520C, sound recognition dictionary data 554, and reward definition data 556.

The server storage section 500s includes, as data to be generated and managed in series, user management data 600, the play data 700, the original data 710, publishing management data 720, live commentary addition management data 730, the modified reproduction data 760, watching management data 780, and current date and time 900. As a matter of course, the server storage section 500s can also store other programs and data (for example, a timer, a counter, various flags, and the like) as appropriate.

The server program 501 is a program that is read and executed by the server processing section 200s to implement the functions of the user management section 202 to the sound recognition section 246 (see FIG. 14).

The distribution client program 503 is an original of a client program that is provided to the user terminal 1500. In the present embodiment, one distribution client program 503 includes a distribution game client program 503a for executing an online game on the user terminal 1500, a distribution live commentary client program 503b for causing the user terminal 1500 to serve as a terminal for live commentary addition, and a distribution watching client program 503c for causing the user terminal 1500 to serve as a terminal for video watching. These programs may be separately distributed to the user terminal 1500.

The game initial setting data 510 includes various initial settings necessary for execution of an online game. For example, the game initial setting data 510 includes object definition data for game object 520A. The object definition data for game object 520A is prepared for each type of game objects (the player character 4, the enemy character 6, other NPC objects, landscape objects, and others) and includes various types of information related to the objects.

The object definition data for live commentary object 520B is prepared for each type of live commentary objects and includes various types of information related to the objects.

The object definition data for viewer action object 520C is prepared for each type of viewer action objects and includes various types of information related to the objects.

Figure 16:
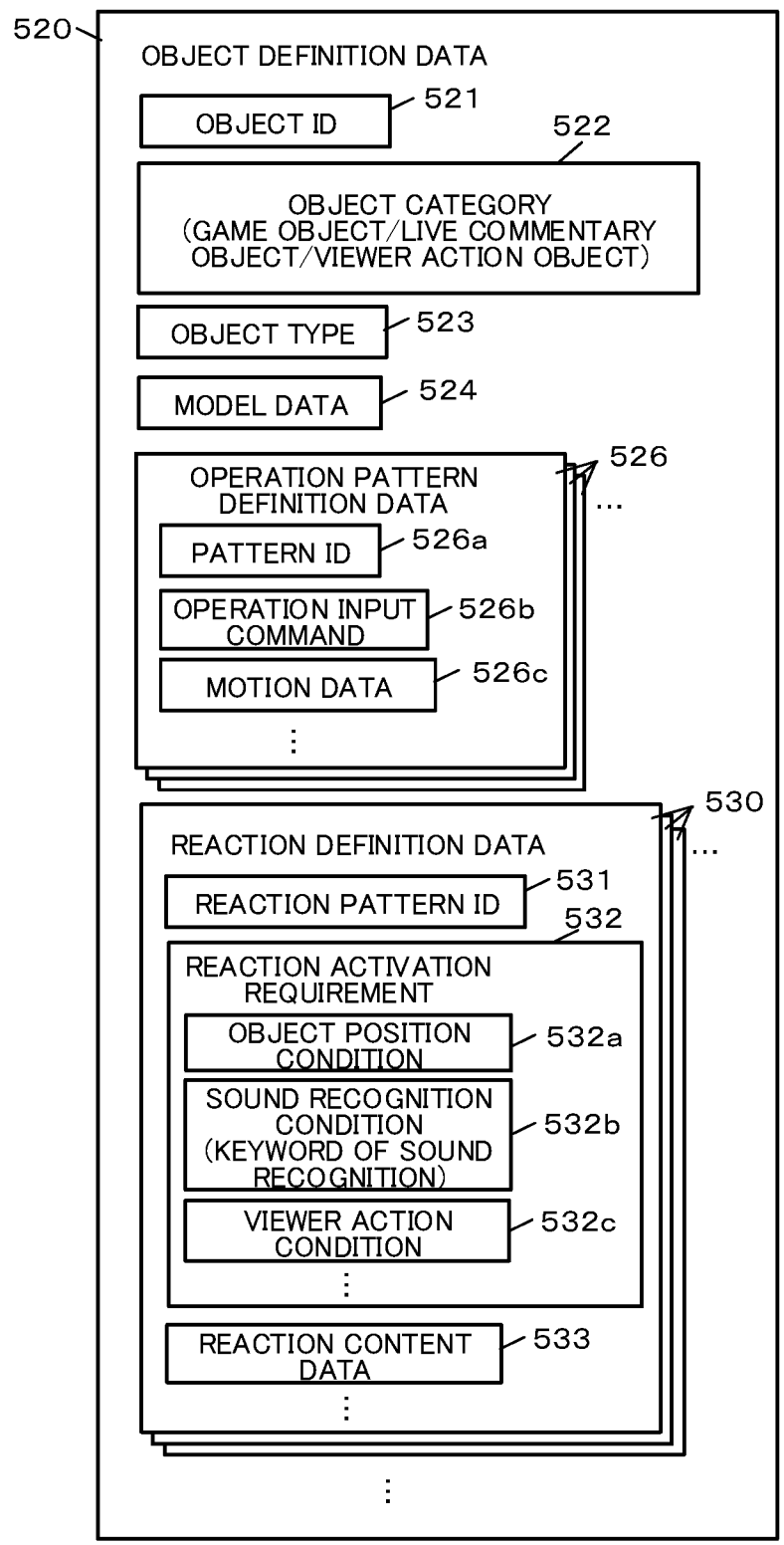
FIG. 16 is a diagram illustrating a data configuration example of object definition data.

The object definition data for game object 520A, the object definition data for live commentary object 520B, and the object definition data for viewer action object 520C have a data configuration as shown in FIG. 16, for example.

That is, the object definition data 520 (520A, 520B, 520C, and 520D) includes a unique object ID 521, an object category 522 indicating which of the game object, the live commentary object, and the viewer action object is the definition data, an object type 523, model data 524, operation pattern definition data 526, and reaction definition data 530. Note that data other than the foregoing ones can be included as appropriate.

The operation pattern definition data 526 is prepared for each operation pattern of the object. In particular, the operation pattern definition data 526 in the object definition data for live commentary object 520B contains an operation input command 526b and motion data 526c associated with a unique pattern ID 526a as illustrated in FIG. 16.

The operation input command 526b constitutes an input pattern of an operation icon or an operation button in a command input mode, constitutes a sound recognition keyword in a sound input mode, or constitutes a motion pattern in a motion input mode.

The reaction definition data 530 is prepared for each content of reaction (see FIGS. 12 and 13) and contains various types of setting data related to the reaction. One reaction definition data 530 includes a unique reaction pattern ID 531, a reaction activation requirement 532, and reaction content data 533, for example. Note that data other than the foregoing ones can be included as appropriate.

The reaction activation requirement 532 describes a condition to be satisfied for activating the reaction indicated by the definition data. For example, the reaction activation requirement 532 is described using an object position condition 532a, a sound recognition condition 532b, a viewer action condition 532c, and others.

The object position condition 532a includes a combination of object types as targets and a range of the positional relationship between the objects. Accordingly, the reaction to be activated when "the avatar 7 has approached the enemy character 6" or the reaction to be activated when "the newly appearing social-tipping item 8 has hit the avatar 7" can be defined, for example.

The sound recognition condition 532b is a condition for result of sound recognition. For example, when a keyword of a weak point in the enemy character 6 is set, the reaction to be activated when the weak point is mentioned by live commentary sound can be defined.

The viewer action condition 532c is a condition for the type and contents of viewer actions. For example, the reaction to be activated when the total number of the viewer actions related to video watching reaches a predetermined number or the reaction to be activated when a specific viewer action (for example, social tipping of a specific type of social-tipping item 8) is executed can be defined.

The reaction content data 533 contains information necessary for implementing the reaction. For example, when the reaction is a motion, the reaction content data 533 contains motion data, and when the reaction is giving of a user point, the reaction content data 533 contains information for determining how many user points to be given to which of the player, the live commentary user, and the watching user.

Returning to FIG. 15, the reward definition data 556 is prepared for each content of reward. One reward definition data 556 includes a giving requirement and the content of a reward to be given when the condition is satisfied, in association with each other. The giving requirement can be defined by a threshold or a range of parameter value preset by the user. For example, the giving requirement can be a range of user point, a threshold of user level, or the like. The giving requirement can be described using the conditions about the number of times when the published video was watched and the watching time.

Figure 17:
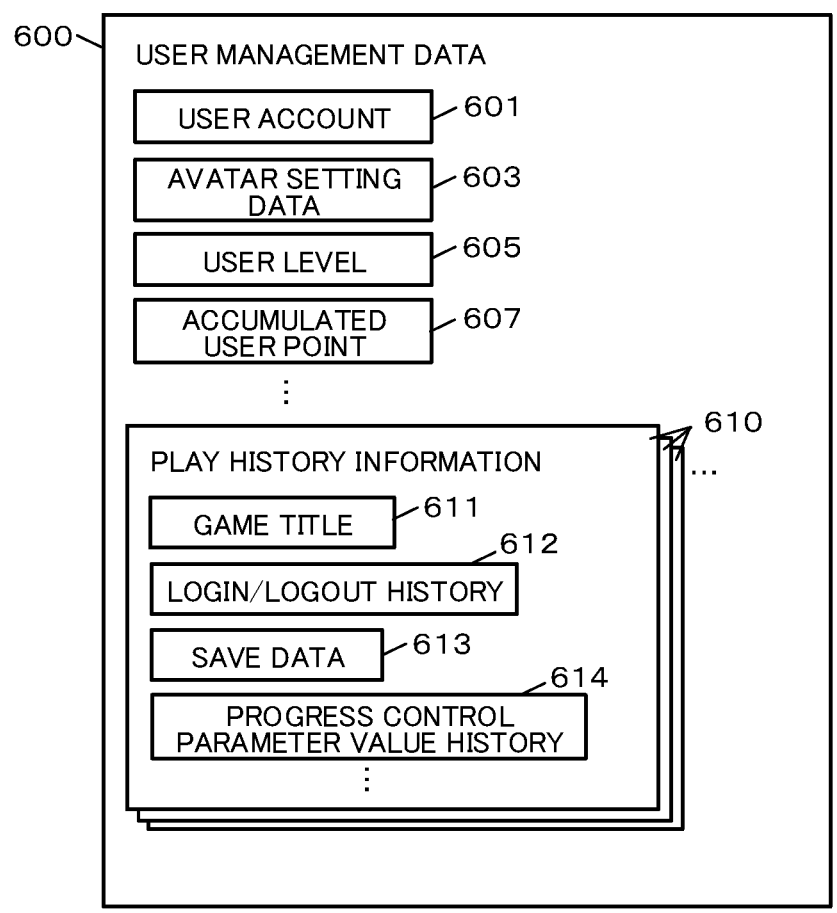
FIG. 17 is a diagram illustrating a data configuration example of user management data.

The user management data 600 is prepared for each registered user in the play data community system 1000, and contains various kinds of data related to the user. One user management data 600 includes a unique user account 601, avatar setting data 603, user level 605 automatically set along with gameplay and live commentary addition, accumulated user point 607, and play history information 610 as shown in FIG. 17, for example. Note that data other than the foregoing ones can be contained as appropriate.

The play history information 610 is prepared for each game title and includes various types of information (data) related to play history of the game. For example, the play history information 610 includes a game title 611, a login/logout history 612, save data 613, and a progress control parameter value history 614. Note that data other than the foregoing ones can be included as appropriate.

The progress control parameter value history 614 is history data of progress control parameter values that are managed in the play data 700 generated for progress control at the time of playing the game. The progress control parameter value history 614 may be a movement history of the player character 4 in the game space, or may record information on gained items and cleared events from the past to the latest gameplays.

Returning to FIG. 15, the play data 700 is prepared for each gameplay on the user terminal 1500, and contains various types of information indicating the latest game progress situation.

Figure 18:
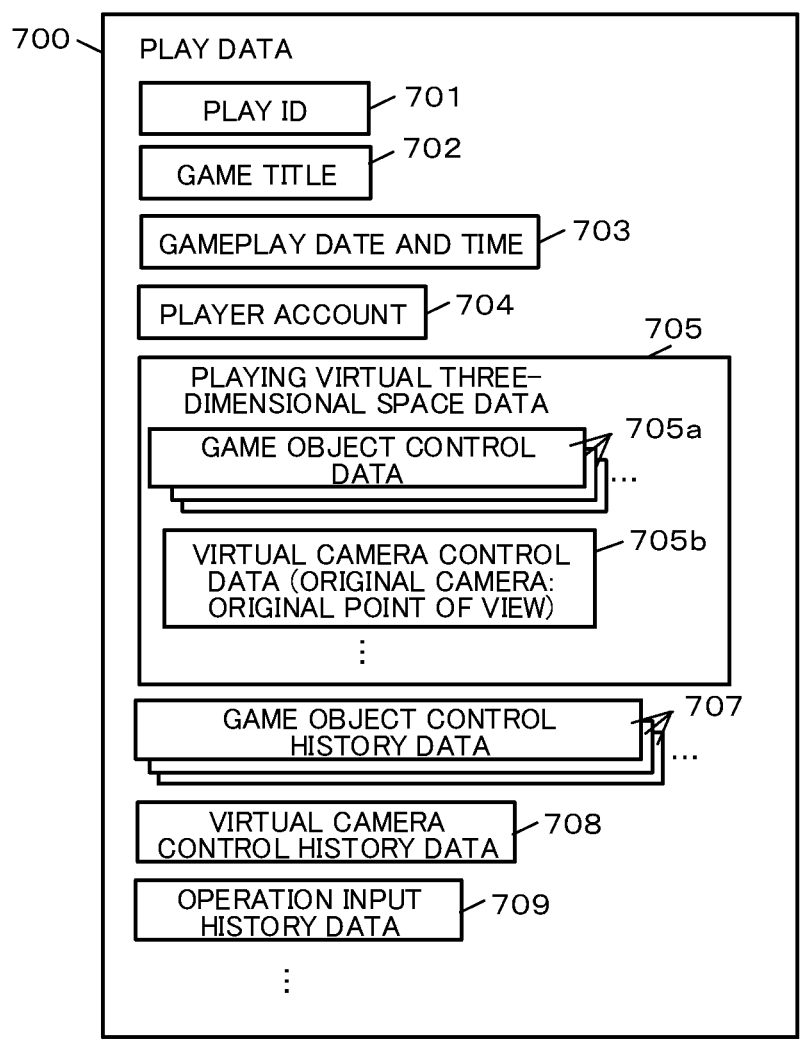
FIG. 18 is a diagram illustrating a data configuration example of play data.

The play data 700 includes a unique play ID 701, a game title 702, gameplay date and time 703, a player account 704, playing virtual three-dimensional space data 705, game object control history data 707, virtual camera control history data 708, and operation input history data 709 as shown in FIG. 18, for example. Note that data other than the foregoing ones can be included as appropriate.

Figure 19:
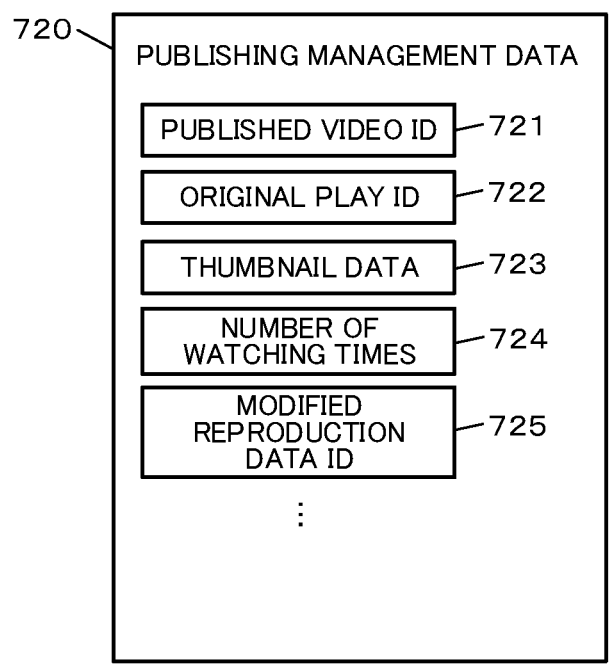
FIG. 19 is a diagram illustrating a data configuration example of publishing management data.

Returning to FIG. 15, the publishing management data 720 is generated for each video published and registered to the registered users and contains various types of information related to the video. One publishing management data 720 includes a unique published video ID 721, an original play ID 722, thumbnail data 723, number of watching times 724, and modified reproduction data ID 725 as shown in FIG. 19, for example. Note that data other than the foregoing ones can be included as appropriate.

When the published video managed in the management data is the original play video, the play ID 701 in the original data 710 (see FIG. 3) is set to the original play ID 722. When live commentary is added to the published video managed in the management data to publish and register a new live commentary video, the original play ID 722 is passed over to the publishing management data 720 of the live commentary video.

When the published video managed in the management data is the original play video, the modified reproduction data ID 725 has a predetermined value indicating an undetermined state. When live commentary is added to the published video managed in the management data to publish a new live commentary video, the modified reproduction data ID 725 is set with identification information (reproduction data ID) of the modified reproduction data 760 generated along with the live commentary addition.

Returning to FIG. 15, the live commentary addition management data 730 is generated for each live commentary addition work and contains various kinds of data indicating the work status.

Figure 20:
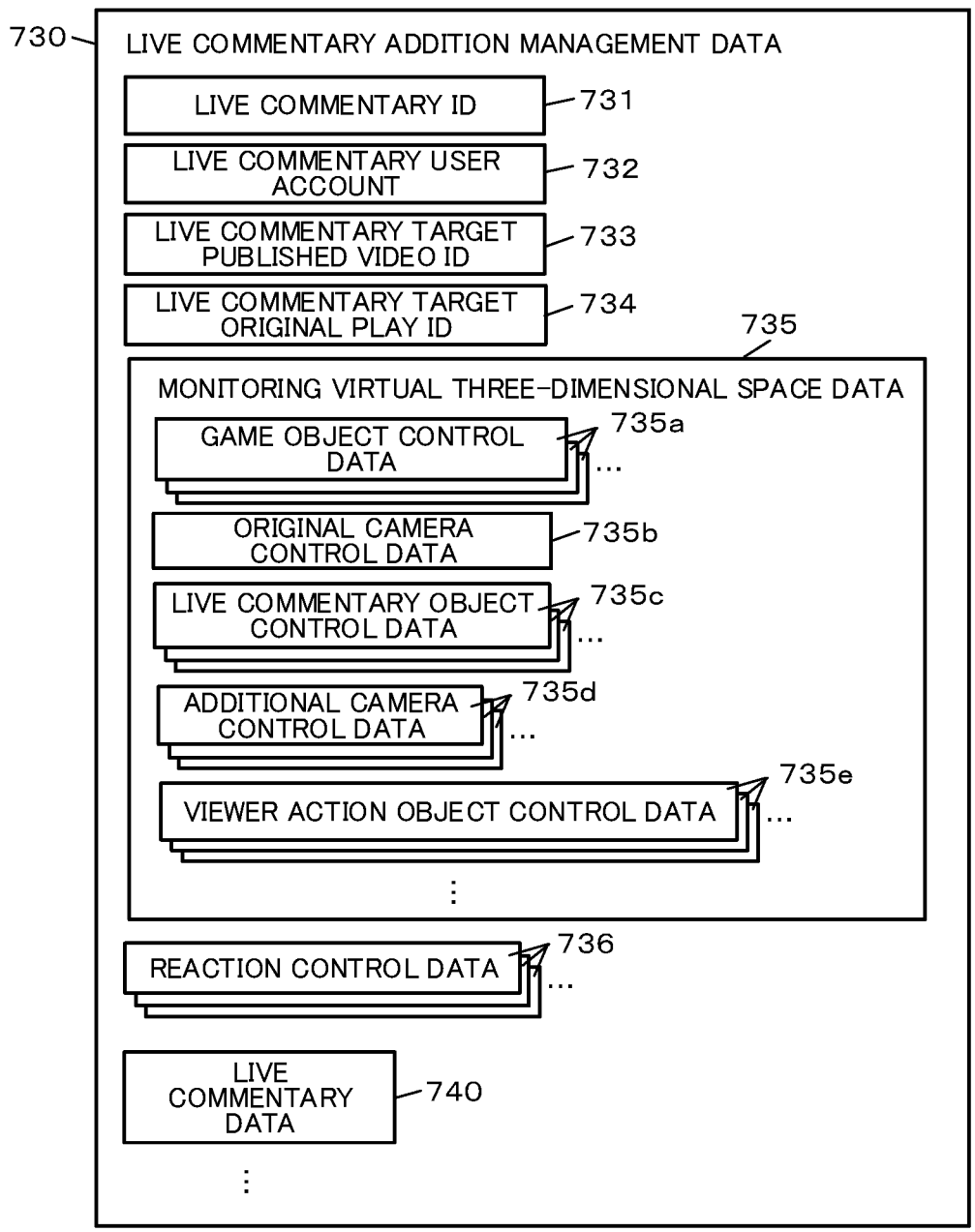
FIG. 20 is a diagram illustrating a data configuration example of live commentary addition management data.

One live commentary addition management data 730 includes a unique live commentary ID 731, a live commentary user account 732, a live commentary target published video ID 733, a live commentary target original play ID 734, monitoring virtual three-dimensional space data 735, reaction control data 736, and live commentary data 740 as shown in FIG. 20, for example. Note that data other than the foregoing ones can be included as appropriate.

The live commentary target published video ID 733 has a copy of the published video ID 721 (see FIG. 19) of the video selected by the live commentary user as a live commentary addition target.

The live commentary target original play ID 734 has a copy of the original play ID 722 (see FIG. 19) of the video selected by the live commentary user as a live commentary addition target video.

The monitoring virtual three-dimensional space data 735 includes game object control data 735a, original camera control data 735b, live commentary object control data 735c, and additional camera control data 735d. When the modified reproduction data 760 of the live commentary target video is present and associated with the viewer action data 790, the monitoring virtual three-dimensional space data 735 includes viewer action object control data 735e. The viewer action object control data 735e includes control data of the social-tipping item 8, the avatar 7b of the watching user, and the comment object 10b derived from the watching user (see FIG. 9).

Figure 21:
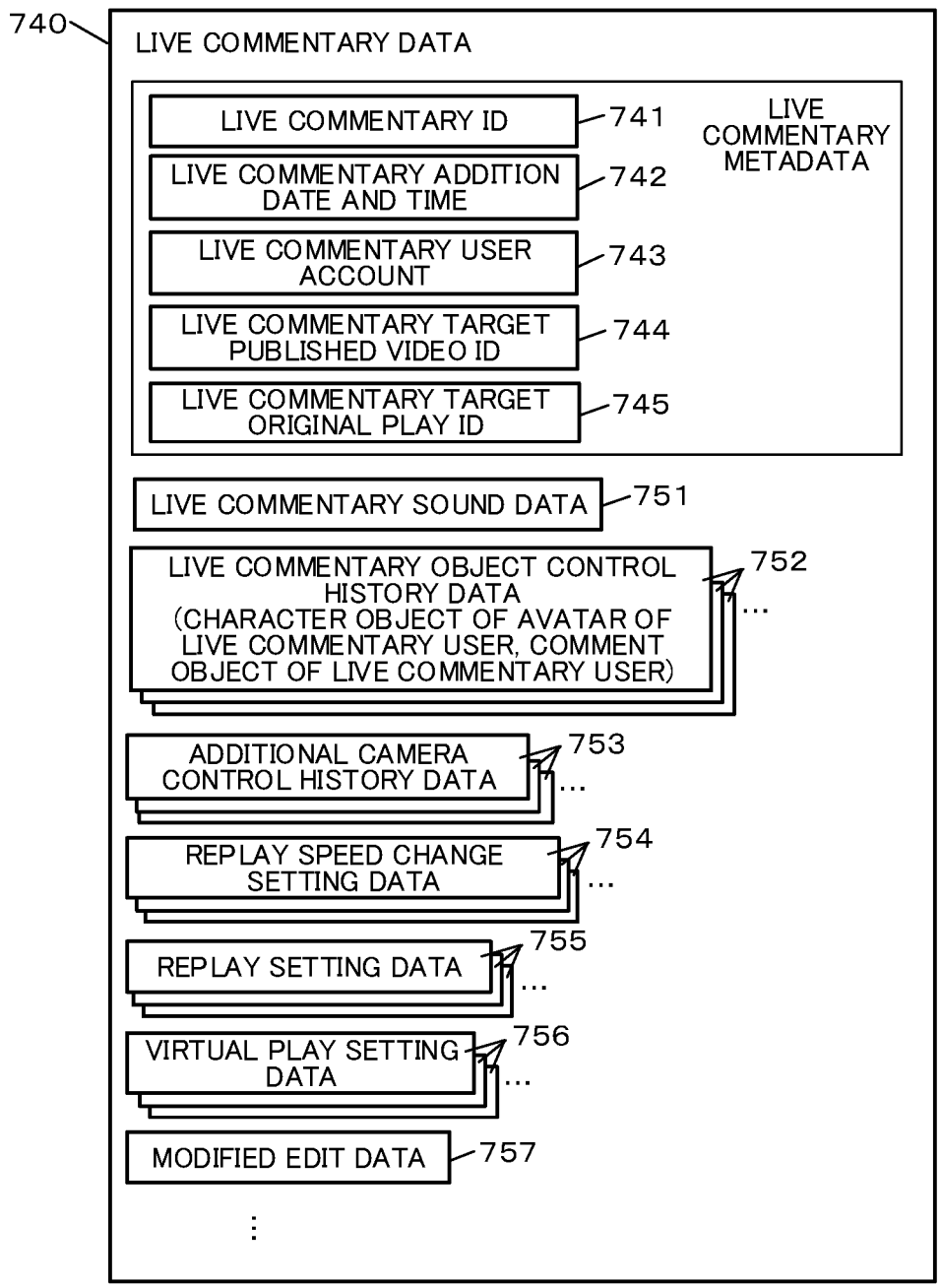
FIG. 21 is a diagram illustrating a data configuration example of live commentary data.

The live commentary data 740 includes a live commentary ID 741 (a copy of the live commentary ID 731), live commentary addition date and time 742, a live commentary user account 743, a live commentary target published video ID 744 (a copy of the live commentary target published video ID 733), a live commentary target original play ID 745 (a copy of the live commentary target original play ID 734), live commentary sound data 751, live commentary object control history data 752, additional camera control history data 753, replay speed change setting data 754, replay setting data 755, virtual play setting data 756, and modified edit data 757 as shown in FIG. 21, for example. Note that data other than the foregoing ones can be included as appropriate.

The live commentary object control history data 752 is prepared for each live commentary object (character object of the avatar 7 of the live commentary user, comment object 10 of the live commentary user, see FIG. 4), and contains control information of the live commentary object on a time-series basis.

The additional camera control history data 753 is prepared for each addition of an additional camera, and contains control information of the additional camera on a time-series basis.

The replay speed change setting data 754 is generated each time a replay speed change operation is performed. One replay speed change setting data 754 contains a change start timing, a change end timing, and a replay speed value in association with one another.

The replay setting data 755 is generated each time the replay operation is performed. One replay setting data 755 contains a replay start timing, a replay end timing, number of replaying times, and a replay speed value in association with one another.

The virtual play setting data 756 is generated for each virtual play. One virtual play setting data 756 contains a rewinding timing, an action change content, and a virtual play execution time length in association with one another.

The modified edit data 757 is data generated when live commentary is added to an edited part of a video as a live commentary addition target, which records the contents of re-editing. Specifically, the modified edit data 757 contains scenes of the video for a period of time elapsed from the start of reproduction of the gameplay based on the original data 710 in order of editing and cutting.

Returning to FIG. 15, the modified reproduction data 760 is data for reproducing the post-modification gameplay in which the original gameplay is modified. The modified reproduction data 760 is generated when the first modification (the first live commentary addition or the execution of the first viewer action along with watching) is made to the published video, and is subsequently updated (re-modified) each time live commentary addition is made or a viewer action is executed by a new watching user.

Figure 22:
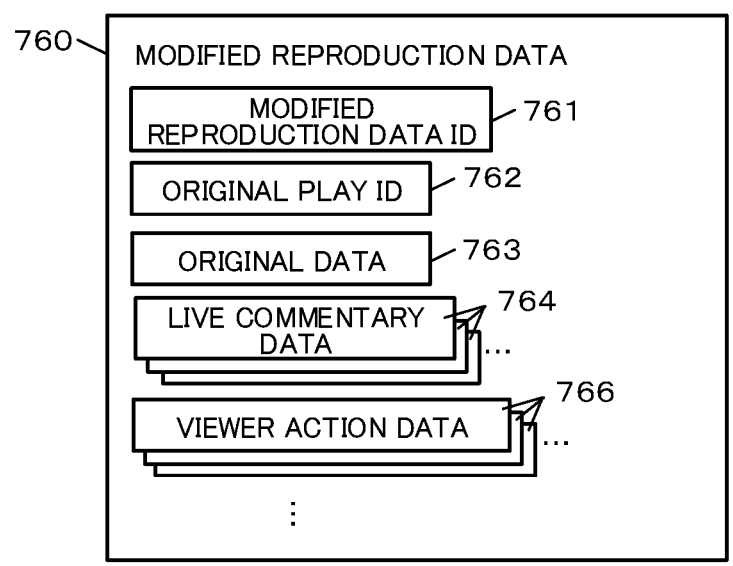
FIG. 22 is a diagram illustrating a data configuration example of modified reproduction data.

One modified reproduction data 760 includes a unique modified reproduction data ID 761, an original play ID 762, original data 763, live commentary data 764, and viewer action data 766 as shown in FIG. 22, for example. Note that data other than the foregoing ones can be included as appropriate.

The original play ID 762 is a copy of the original play ID 722 in the publishing management data 720 (see FIG. 19) of the published video as a latest live commentary addition target or watching target.

The original data 763 is a copy of the original data 710 (see FIGS. 3 and 15) of which the play ID 701 coincides with the original play ID 722 of the publishing management data 720 (see FIG. 19) of the published video as a latest live commentary addition target or watching target.

The live commentary data 764 is data obtained by copying the live commentary data 740 (see FIG. 21) that is generated at the time of live commentary addition after the publishing and registration operation is performed after the live commentary addition. In a state where the live commentary is first added to the original play video, there is only one live commentary data 764. The live commentary data 764 increases in number each repeat of the live commentary addition.

The viewer action data 766 is data obtained by copying the viewer action data 790 (see FIGS. 23 and 24) that is generated by the watching user executing the viewer action during the watching, after the end of the watching. In a state where the live commentary is first added to the original play video, the viewer action data 766 does not exist. When the watching user performs the viewer action while watching the live commentary video, the viewer action data 790 (see FIGS. 23 and 24) generated by the watching is newly registered after the end of the watching.

Returning to FIG. 15, the watching management data 780 is generated each time the published video is watched on the user terminal 1500 of the watching user.

Figure 23:
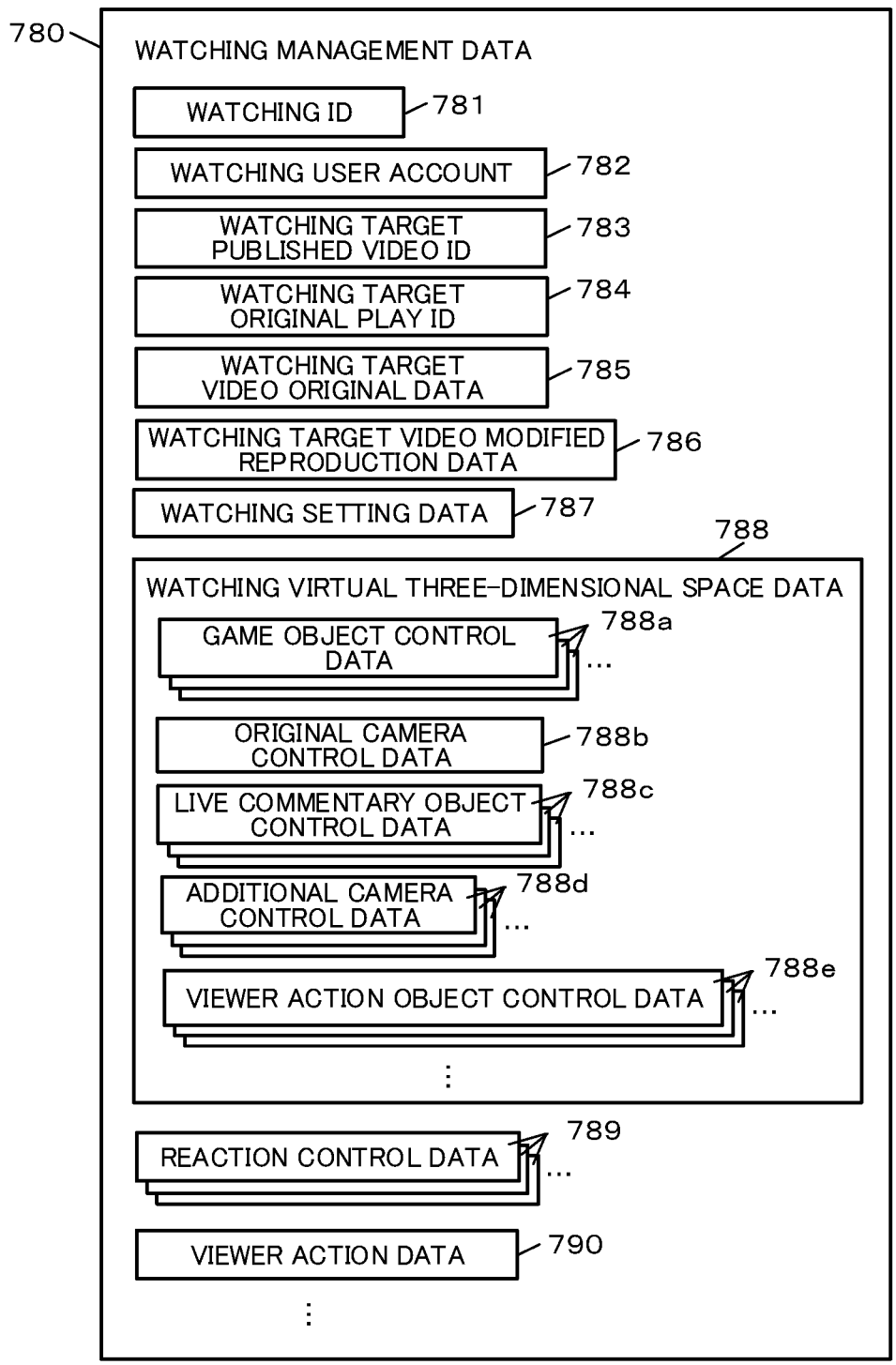
FIG. 23 is a diagram illustrating a data configuration example of watching management data.

One watching management data 780 has a unique watching ID 781, a watching user account 782, a watching target published video ID 783, a watching target original play ID 784, watching target video original data 785, watching target video modified reproduction data 786, watching setting data 787, watching virtual three-dimensional space data 788, reaction control data 789, and viewer action data 790 as shown in FIG. 23, for example. Note that data other than the foregoing ones can be included as appropriate.

The watching target published video ID 783 is a copy of the published video ID 721 (see FIG. 19) of the published video as a watching target.

The watching target original play ID 784 is a copy of the original play ID 722 (see FIG. 19) of the published video as a watching target.

The watching target video original data 785 is a copy of the original data 710 (see FIG. 3) that coincides with the original play ID 722 (see FIG. 19) of the published video as a watching target.

The watching target video modified reproduction data 786 is a copy of the modified reproduction data 760 (see FIG. 22) of which the modified reproduction data ID 761 coincides with the modified reproduction data ID 725 (see FIG. 19) of the published video as a watching target.

The watching setting data 787 contains results of specification operations on the watching setting screen W11 (see FIG. 11).

The watching virtual three-dimensional space data 788 includes game object control data 788a and original camera control data 788b. When the video as a watching target is a live commentary video, the watching virtual three-dimensional space data 788 further includes live commentary object control data 788c and additional camera control data 788d. When the watching user has already watched the video and executed the viewer action during the watching, the watching virtual three-dimensional space data 788 further includes viewer action object control data 788e.

Figure 24:
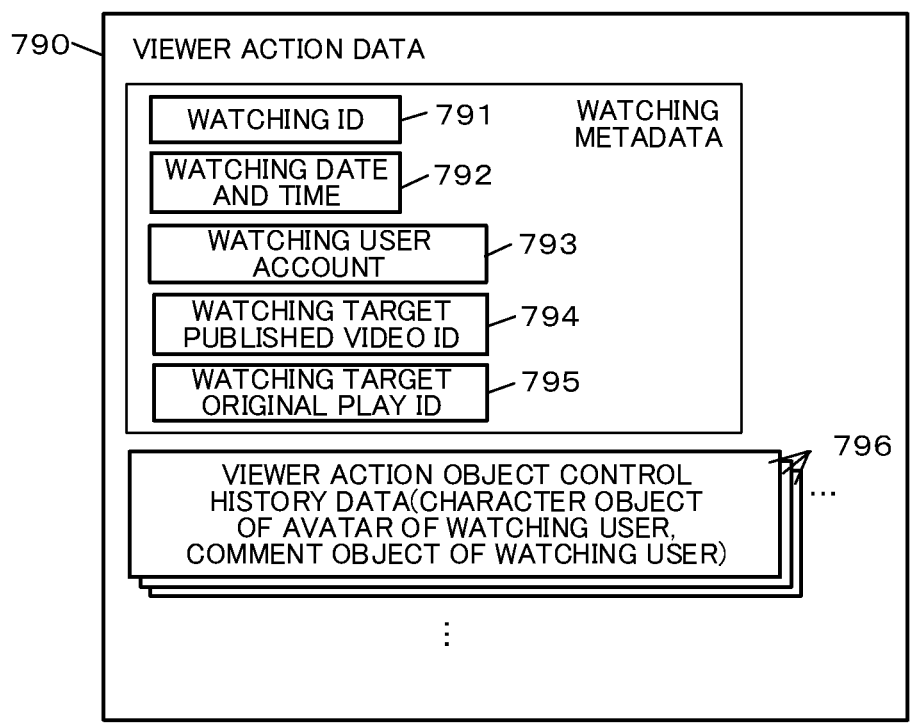
FIG. 24 is a diagram illustrating a data configuration example of viewer action data.

The viewer action data 790 includes a unique watching ID 791, watching date and time 792, a watching user account 793, a watching target published video ID 794 (a copy of the watching target published video ID 783), a watching target original play ID 795 (a copy of the watching target original play ID 784), and viewer action object control history data 796 as illustrated in FIG. 24, for example. Note that data other than the foregoing ones can be included as appropriate.

The viewer action object control history data 796 is prepared for each viewer action object (a character object of the avatar 7*b* of the watching user, the comment object 10*b* of the watching user, see FIG. 9) and contains control information of the object on a time-series basis.

Figure 25:
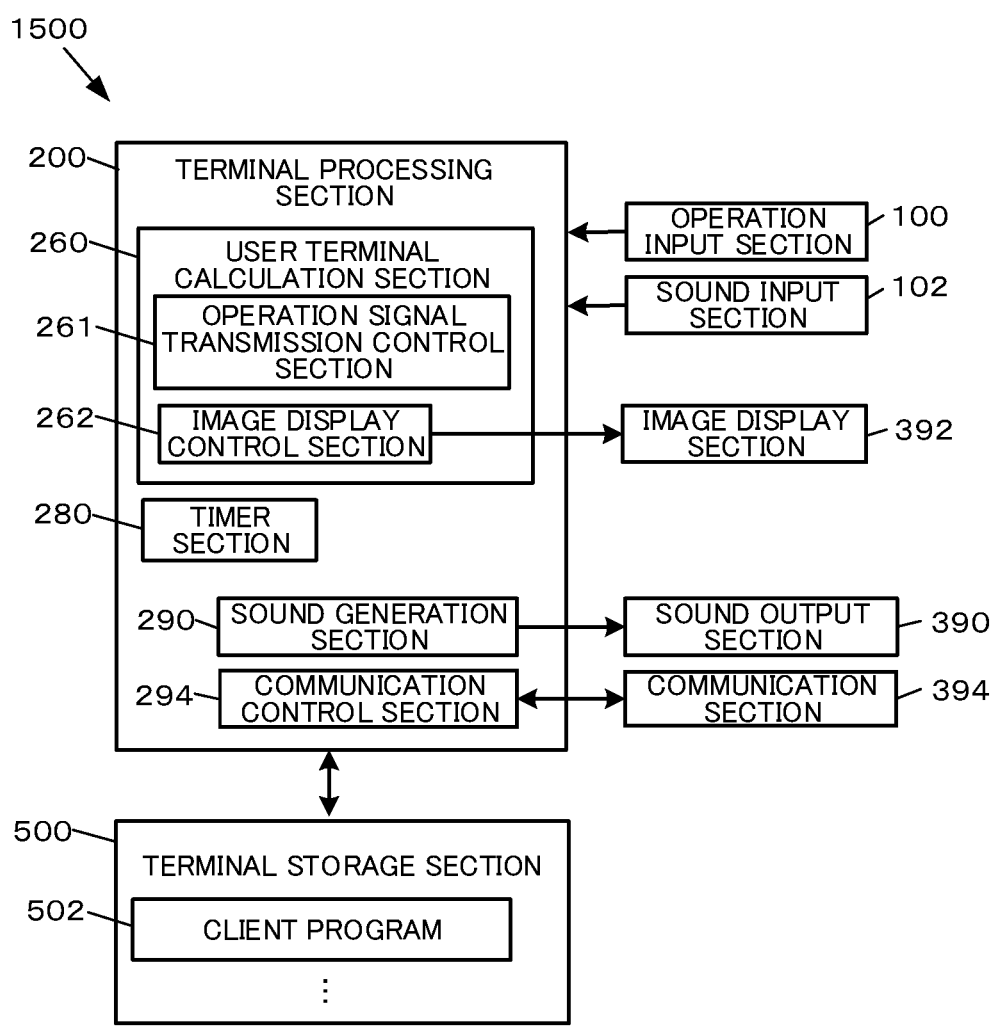
FIG. 25 is a functional block diagram illustrating a functional configuration example of a user terminal.

FIG. 25 is a functional block diagram illustrating a functional configuration example of the user terminal 1500 in the present embodiment. The user terminal 1500 includes an operation input section 100, a sound input section 102, a terminal processing section 200, a sound output section 390, an image display section 392, a communication section 394, and a terminal storage section 500.

The operation input section 100 outputs operation input signals in accordance with various operations inputs by the player to the terminal processing section 200. The operation input section 100 can be implemented by a push switch, a joystick, a touch pad, a track ball, an accelerometer, a gyro, a CCD module, or the like. The operation input section 100 corresponds to the arrow key 1502, the button switch 1504, the touch panel 1506, and the image sensor unit 1520 illustrated in FIG. 2.

The sound input section 102 collects sounds emitted by the user (user sounds) and environmental sounds, and outputs sound signals to the terminal processing section 200. The microphone 1512 corresponds to the sound input section 102 in the example of FIG. 2.

The terminal processing section 200 is implemented by a microprocessor such as a CPU or GPU and electronic components such as an IC memory. The terminal processing section 200 controls input/output of data between the functional sections including the operation input section 100 and the terminal storage section 500. The terminal processing section 200 executes various calculation processes based on a predetermined program or data, an operation input signal from the operation input section 100, and various kinds of data received from the server system 1100 to control the operations of the user terminal 1500. The control board 1550 illustrated in FIG. 2 corresponds to the terminal processing section 200. The terminal processing section 200 according to the present embodiment includes a user terminal calculation section 260, a timer section 280, a sound generation section 290, and a communication control section 294.

The user terminal calculation section 260 includes an operation signal transmission control section 261 and an image display control section 262.

The operation signal transmission control section 261 performs a process of transmitting various kinds of data and requests to the server system 1100 in accordance with an operation performed on the operation input section 100. In the present embodiment, the operation signal transmission control section 261 also generates sound data of user sounds collected by the sound input section 102 and performs controls related to external transmission.

The image display control section 262 performs a control for displaying a game screen or the like based on various kinds of data received from the server system 1100. In the present embodiment, the image display control section 262 is configured to generate gameplay images in the server system 1100, but can be configured to generate the game space images on the user terminal 1500. In this case, the image display control section 262 also includes a control of objects arranged in a virtual three-dimensional space for generating 3DCG, for example.

The image display control section 262 outputs image signals to the image display section 392.

The image display section 392 displays various screens based on the image signals input from the image display control section 262. The image display section 392 can be implemented by an image display device, such as a flat panel display, a projector, or a head-mounted display. In the present embodiment, the touch panel 1506 illustrated in FIG. 2 corresponds to the image display section 392.

The sound generation section 290 is implemented by a processor such as a digital signal processor (DSP) or a sound synthesizing IC, or an audio codec capable of playing a sound file, or the like. The sound generation section 290 generates sound effects and BGMs related to the game, sound signals of various operational sounds, generation of live commentary videos, and sound signals of operational sounds and sound effects related to video watching, and outputs the same to the sound output section 390.

The sound output section 390 is implemented by a device that outputs sounds such as sound effects and BGM, based on the sound signal input from the sound generation section 290. The speaker 1510 illustrated in FIG. 2 corresponds to the sound output section 390.

The communication control section 294 performs a data process related to data communication, and implements exchange of data with an external device through the communication section 394. The communication section 394 connects to the network 9 to implement communications. For example, the communication section 394 is implemented by a transceiver, a modem, a terminal adaptor (TA), a jack for wired communication cable, a control circuit, and the like, and corresponds to the wireless communication module 1553 illustrated in FIG. 2.

The terminal storage section 500 stores programs for implementing various functions for causing the terminal processing section 200 to comprehensively control the user terminal 1500, various kinds of data, and the like. The terminal storage section 500 is used as a work area for the terminal processing section 200, and temporarily stores results of calculations executed by the terminal processing section 200 in accordance with various programs, input data from the operation input section 100, and the like. These functions are implemented by an IC memory such as RAM or ROM, a magnetic disc such as a hard disc, an optical disc such as a CD-ROM or DVD, and the like. The terminal storage section 500 corresponds to the IC memory 1552 and the memory card 1540 included in the control board 1550 illustrated in FIG. 2. The terminal storage section 500 may be implemented by an online storage.

The terminal storage section 500 according to the present embodiment stores a client program 502. Note that programs and data other than the foregoing ones can be stored as appropriate.

The client program 502 is an application software that is read and executed by the terminal processing section 200 to implement a function of the user terminal calculation section 260. In the present embodiment, the client program 502 is a copy of the distribution client program 503 (see FIG. 15) provided from the server system 1100. The client program 502 may be a dedicated client program or may be formed by a web browser program and a plugin that implements an interactive image display.

Next, operations of the play data community system 1000 according to the present embodiment will be described.

Figure 26:
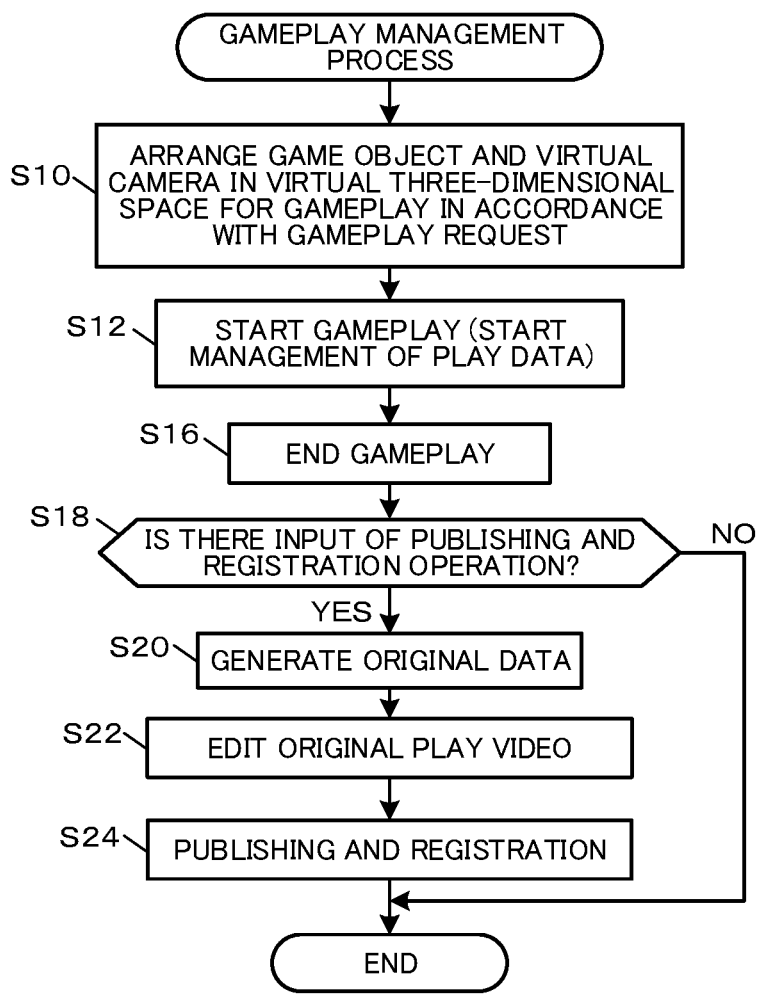
FIG. 26 is a flowchart of a gameplay management process.

FIG. 26 is a flowchart of a gameplay management process related to the original gameplay.

When the user 2 who wishes for gameplay logs in to the play data community system 1000 on the user terminal 1500 and inputs a predetermined gameplay start operation, the user terminal 1500 transmits a predetermined gameplay request to the server system 1100.

The server system 1100 prepares a virtual three-dimensional space for gameplay in accordance with the gameplay request, and arranges a game object and an original virtual camera (the original camera CM0) in accordance with the game initial setting data 510 (step S10). The server system 1100 causes the play of the online game to be started on the user terminal 1500 of the user 2 as a player (step S12). Along with the start of the gameplay, the server system 1100 starts recording and management of the play data 700, that is, the data as a base of the original data 710 (step S14).

After the end of the gameplay (step S16), upon detection of an input of a predetermined publishing and registration operation (YES in step S18), the server system 1100 generates the original data 710 based on the play data 700 (step S20).

Next, the server system 1100 executes an editing process of the original play video (step S22). Specifically, the server system 1100 prepares a virtual three-dimensional space for original play video generation, and reproduces the gameplay performed immediately before based on the original data 710 in the initial state to generate and provide the gameplay video as an editing material. Then, the server system 1100 accepts an input of a video editing operation on the user terminal 1500. In accordance with an input of the video editing operation, the server system 1100 adds the edit data 712 and the metadata 714 to the original data 710 (see FIG. 3) to generate thumbnails for publishing. Thus, although the video data called the original play video does not exist, the data for reproducing the original gameplay at the time of live commentary addition or watching on the user terminal 1500 is prepared. The gameplay video as an editing material may be a video image recorded in advance during the gameplay.

Next, the server system 1100 publishes and registers the original play video (step S24). That is, the server system 1100 newly generates the publishing management data 720 (see FIG. 19).

Figure 27:
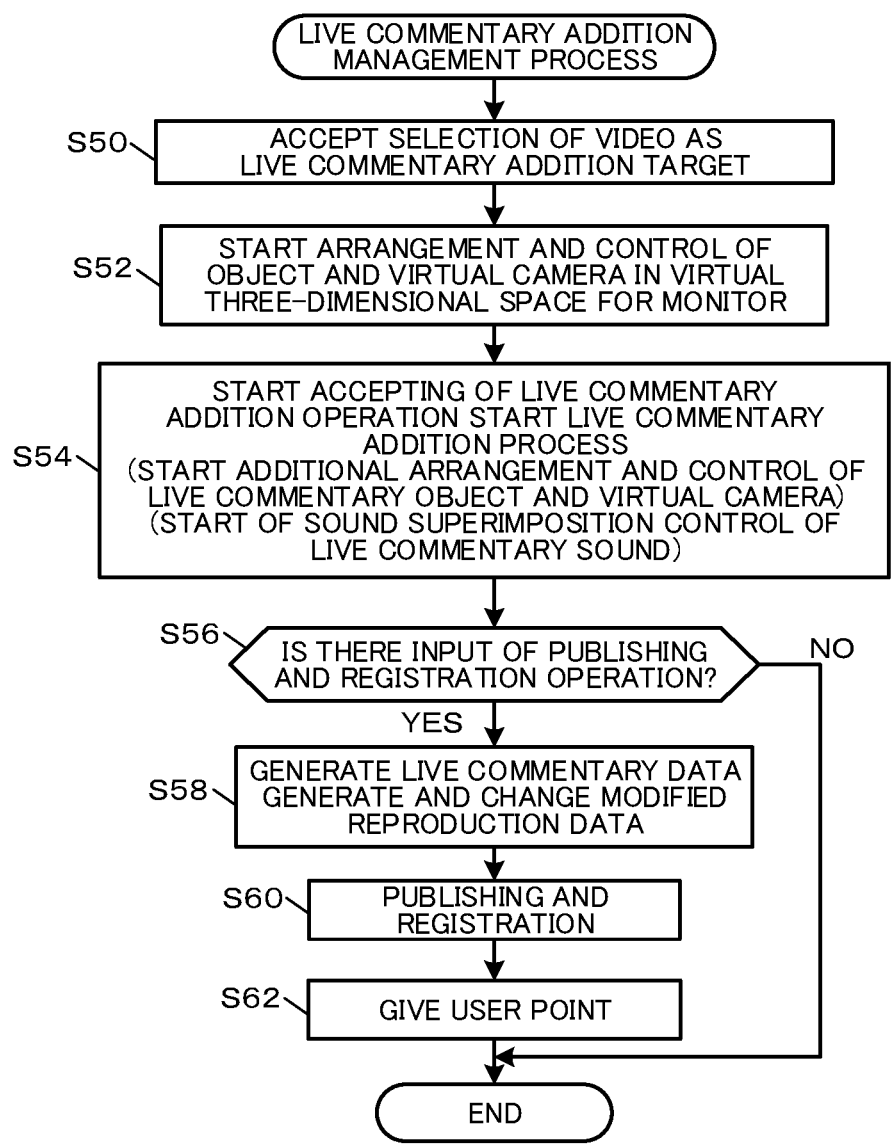
FIG. 27 is a flowchart of a live commentary addition management process.

FIG. 27 is a flowchart of a live commentary addition management process.

When the watching user who wishes to add live commentary to a video published to registered users in the play data community system 1000 logs in to the play data community system 1000 on the user terminal 1500 and inputs a predetermined live commentary addition request operation, the user terminal 1500 transmits a predetermined live commentary addition request to the server system 1100.

The server system 1100 accepts a selection of a published video as a live commentary addition target on the user terminal 1500 having transmitted the request (step S50), prepares a virtual three-dimensional space for monitor, and arranges objects and a virtual camera there (step S52). Specifically, the server system 1100 arranges a game object and a virtual camera (the original camera CM0) based on the original data 710 indicated by the original play ID 722 (see FIG. 19) in the publishing management data 720 of the selected published video, and starts to control them.

Next, the server system 1100 starts to accept a live commentary addition operation on the user terminal 1500 of the live commentary user while providing the video image in the virtual three-dimensional space for monitor as a monitor video image, and starts a live commentary addition process (step S54).

When starting the live commentary addition process, the server system 1100 records the live commentary sound data in accordance with a live commentary sound input operation, and starts a sound superimposition control on the sounds of the video as a live commentary addition target. The server system 1100 also arranges the avatar 7 of the live commentary user in the virtual three-dimensional space for monitor in accordance with an avatar addition operation input, and starts an operation control of the arranged avatar 7. The server system 1100 also starts arrangement and control of the comment object 10 in accordance with a comment addition operation input. The server system 1100 also starts arrangement and control of the additional camera CM1 in accordance with a point-of-view addition operation input. The server system 1100 also changes the replay speed of the partial or entire video as a live commentary addition target in accordance with a replay speed change operation input. The server system 1100 also replays part of the video as a live commentary addition target in accordance with a replay operation input. The server system 1100 also executes "virtual play" in accordance with a start operation input of virtual play where an "if" world is seen or "if" play is actually performed. Results of live commentary addition are stored in the live commentary addition management data 730 (see FIG. 20).

When detecting an input of a publishing and registration operation (step S56), the server system 1100 generates the live commentary data 740 (see FIG. 21) and generates or changes the modified reproduction data 760 (see FIG. 22) (step S58).

Then, the server system 1100 publishes and registers the video to which the live commentary is added (step S60). That is, the server system 1100 prepares data for reproducing the modified gameplay to be displayed as a live commentary video, not video data as a live commentary video, and registers the same as a publishing target.

Then, the server system 1100 gives a user point to at least one of the player of the video as a live commentary addition and the live commentary user (step S62), and terminates the live commentary addition management process.

Figure 28:
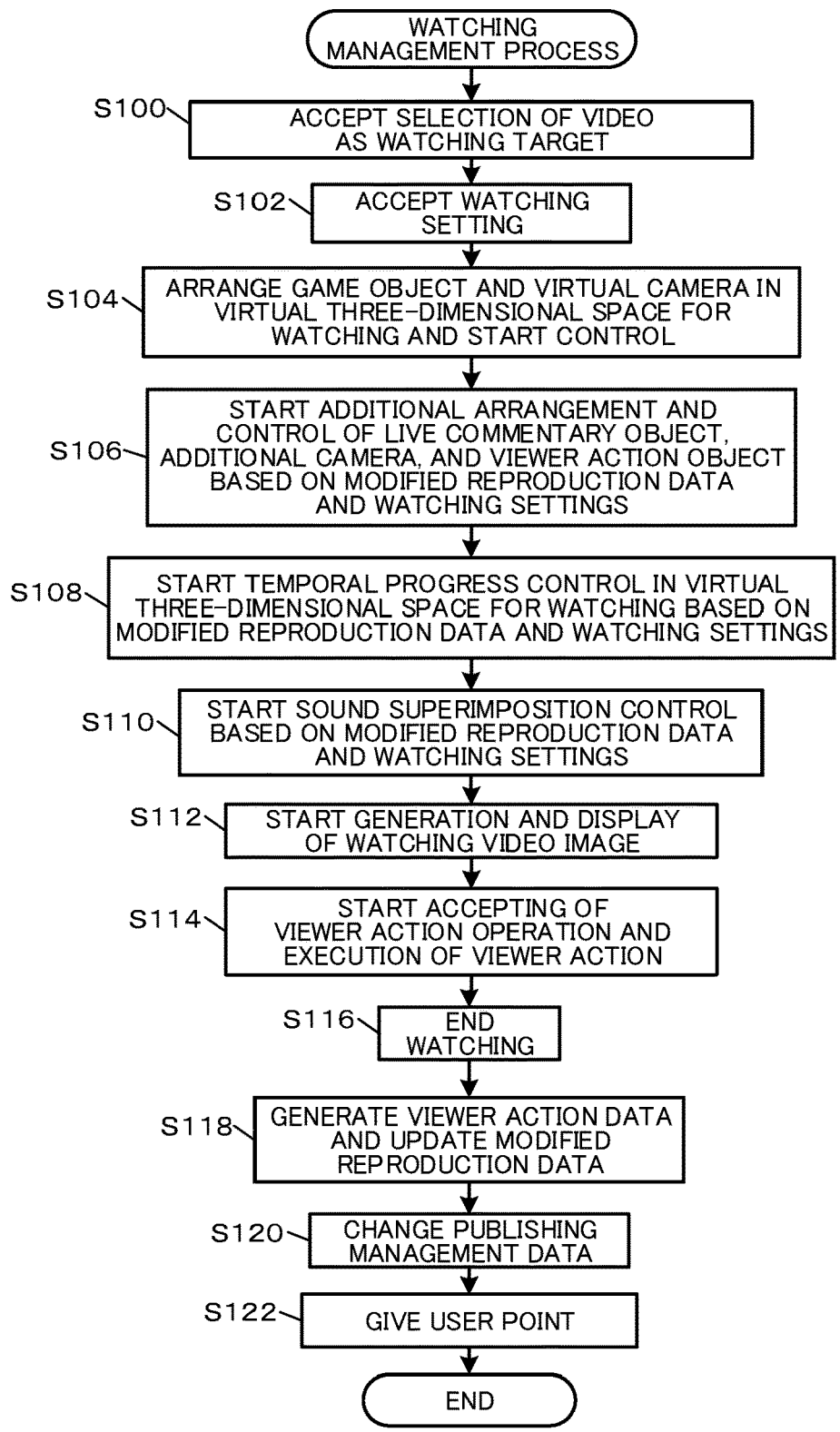
FIG. 28 is a flowchart of a watching management process.

FIG. 28 is a flowchart of a watching management process.

When the watching user who wishes to watch a video published to the registered users in the play data community system 1000 logs in to the play data community system 1000 on the user terminal 1500 and inputs a predetermined watching request operation, the user terminal 1500 transmits a predetermined watching request to the server system 1100.

The server system 1100 accepts a selection of a video as a watching target on the user terminal 1500 having transmitted the request (step S100), and accepts watching settings (step S102). That is, the server system 1100 displays the watching setting screen W11 (see FIG. 11) and accepts selections of sound, camerawork, and viewer action to be applied for watching.

Next, the server system 1100 prepares a virtual three-dimensional space for watching, and arranges a game object and an original camera based on the original data 710 of the video as a watching target, and starts to control them (step S104).

The server system 1100 starts additional arrangement and control of the live commentary object, the additional camera, and the viewer action object based on the modified reproduction data 760 of the video as a watching target and the watching settings (step S106).

The server system 1100 also starts a temporal progress control in the virtual three-dimensional space for watching based on the modified reproduction data 760 of the video as a watching target (step S108).

The server system 1100 also starts a sound superimposition control based on the modified reproduction data 760 of the video as a watching target and the watching settings (step S110).

Next, the server system 1100 starts generation of a video image for watching and display of the video image on the user terminal 1500 of the watching user (step S112). Accordingly, the watching user can watch the desired video.

Along with the start of the watching, the server system 1100 starts to accept a viewer action operation and starts to execute the viewer action (step S114).

At the end of the watching (step S116), the server system 1100 generates the viewer action data 790 based on this watching (see FIG. 24), adds the generated viewer action data 790 to the modified reproduction data 760 of the published video as a watching target, and changes the modified reproduction data 760 (step S118).

Then, the server system 1100 updates the publishing management data 720 (step S120), gives a user point to at least any of the persons concerned in the video as a watching target (step S122), and terminates the watching management process.

Figure 29:
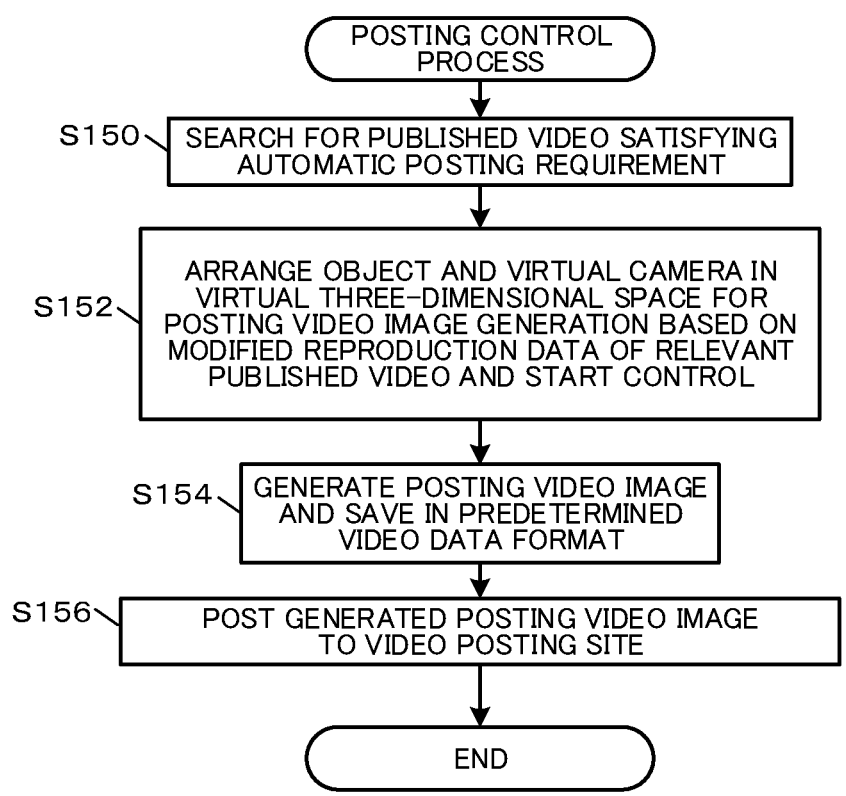
FIG. 29 is a flowchart of a posting control process.

FIG. 29 is a flowchart of a posting control process.

This process is automatically executed by the server system 1100 in a cyclic manner. In the process, the server system 1100 first extracts a video satisfying an automatic posting requirement from the videos published to the registered users (step S150).

The automatic posting requirement can be set as appropriate. For example, the automatic posting requirement can be set to "a new original play video is published and registered", "a new live commentary video is published and registered", "the number of times of watching has reached a predetermined number", "the increasing rate of the number of times of watching has reached a predetermined standard", or the like. Otherwise, the automatic posting requirement may be satisfaction of a condition based on the amount of social tipping or the number of comments of the watching user. The definition data of the automatic posting requirement is separately prepared in the server storage section 500s.

Next, the server system 1100 prepares a virtual three-dimensional space for posting video generation, arranges objects and virtual cameras based on the modified reproduction data 760 of the extracted video, starts an operation control of these objects and cameras, starts a sound superimposition control (step S152), thereby to generate video data of the posting video in a predetermined video data format (step S154).

The server system 1100 then performs a control to automatically post the generated posting video to a predetermined video posting site (video sharing site) (step S156), and terminates the posting control process.

According to the present embodiment, it is possible to provide a new method for enjoying publishing a video image of gameplay.

That is, according to a conventional method for enjoying publishing a video image of gameplay, the original gameplay video does not change. Even when the live commentary user performs an action of adding live commentary or the watching user performs a viewer action, the original gameplay video is not affected and there is a strict sense of separation between the player and the live commentary user or the watching user.

However, according to the new method provided by the present embodiment, when the live commentary user performs an action of adding live commentary or the watching user performs a viewer action, new objects according to the live commentary or the viewer action appear in the game world of the original gameplay. Therefore, the live commentary user or the watching user can add live commentary to the original gameplay or watch the original gameplay with a real feeling of involvement in the world of the original gameplay. This creates a deep sense of sharing rather than a conventional strict sense of separation.

When the live commentary user adds live commentary or the watching user performs a viewer action, if there is caused a relationship between the game object and the added live commentary object or viewer action object, the game object is controlled to automatically react. This allows the users to enjoy a sense of realism that could not be felt in conventional video watching.

This makes it possible to, for each user other than the player of the original game, such as the live commentary user or the watching user, cause new objects (first object, second object) separately from the objects in the original gameplay to appear in the game, add new points of view (first point of view, second point of view) separately from the point of view for generating the game screen of the original gameplay, and add new sounds (first sound, second sound) separately from the sound in the original gameplay. At the time of watching, the user can watch not only the original gameplay but also a modified reproduction play to which new objects, points of view, and sounds are added. That is, the actions of the live commentary user and the watching user are reflected in the reproduction play in which the original gameplay is reproduced. This makes it possible to provide a technique for implementing new and innovative ways to enjoy one original gameplay.

According to the present embodiment, the live commentary data 764 of the modified reproduction data 760 (see FIG. 22, a copy of the live commentary data 740, see FIG. 21) makes it possible to store information for understanding to which original play (seen from the original play ID 762 of the live commentary target) who (seen from the live commentary user account 743, see FIG. 21) added what live commentary (seen from the live commentary sound data 751, the live commentary object control history data 752, the additional camera control history data 753, the replay speed change setting data 754, the replay setting data 755, the virtual play setting data 756, and others).

In addition, it can be known from the viewer action data 766 of the modified reproduction data 760 (see FIG. 22, a copy of the viewer action data 790, see FIG. 24) what watching user (seen from the watching user account 793) performed what action (seen from the play history information 610 of each watching user, see FIG. 17) after watching. In other words, it is possible to estimate the influence of video watching on the action of the watching user.

Second Embodiment

Next, a second embodiment of the present disclosure will be described. Hereinafter, differences from the first embodiment will be mainly described, and the same components as those of the first embodiment will be given the same reference signs and duplicated descriptions thereof will be omitted.

The present embodiment is different from the first embodiment in that, out of the processes executed by the server system 1100, the process related to live commentary addition and the process related to watching are executed on the user terminal 1500.

Figure 30:
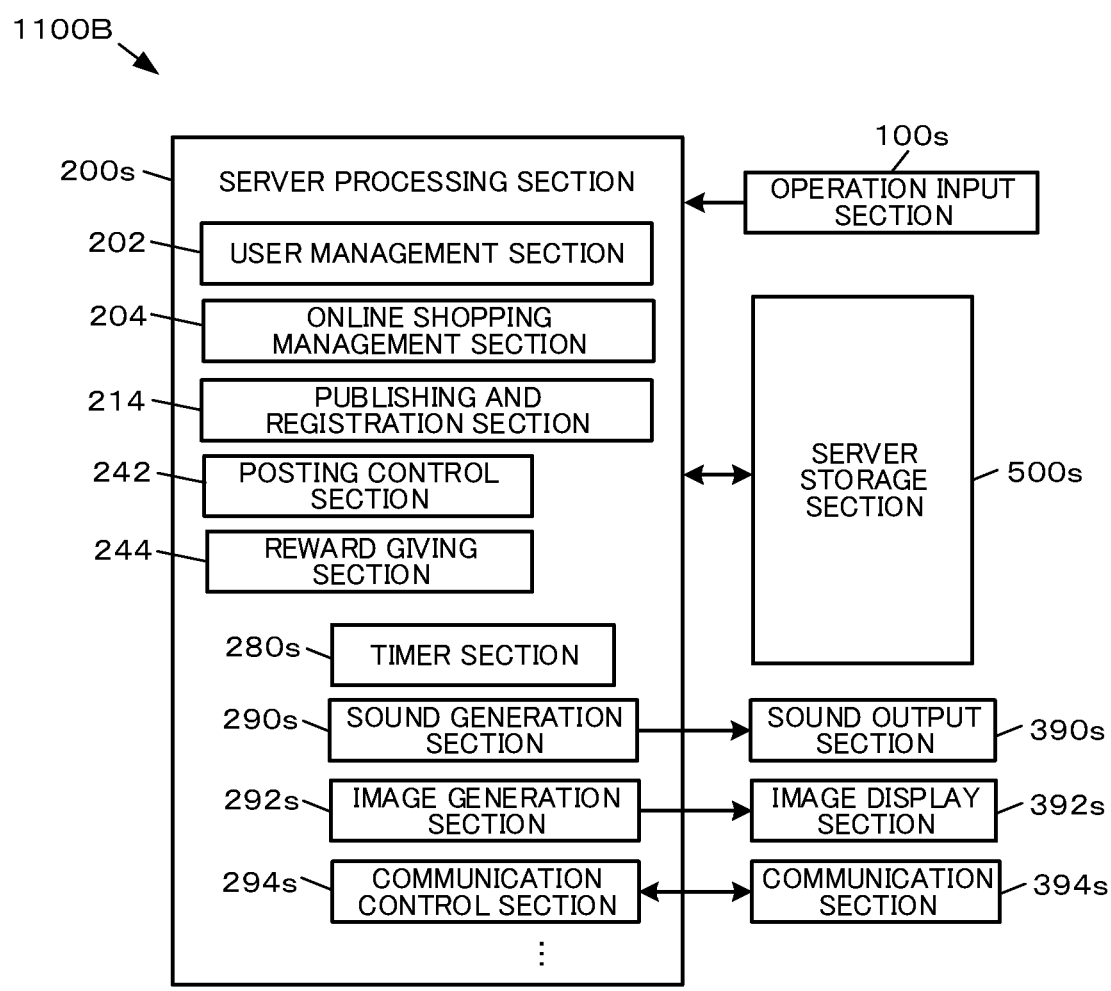
FIG. 30 is a block diagram illustrating a functional configuration example of a server system according to a second embodiment.

FIG. 30 is a block diagram illustrating a functional configuration example of a server system 1100B according to the present embodiment. In the server system 1100B, the game management section 210, the original data generation and registration section 212, the live commentary addition management section 220, the watching management section 230, the selection replay output control section 240, and the sound recognition section 246 are omitted from the functional configuration of the server system 1100 according to the first embodiment.

Figure 31:
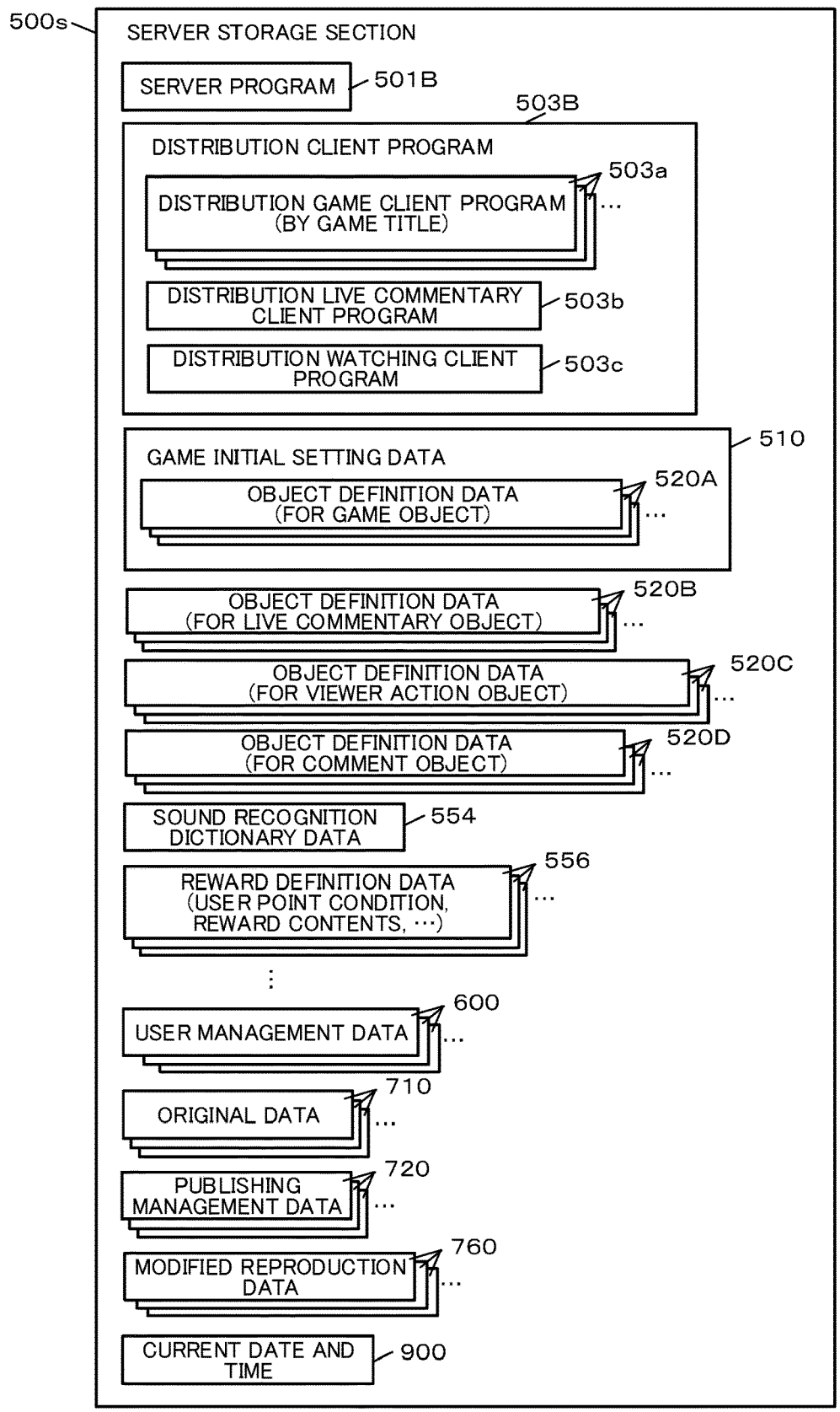
FIG. 31 is a diagram illustrating an example of programs and data stored in a server storage section according to the second embodiment.

FIG. 31 is a diagram illustrating an example of programs and data stored in the server storage section 500s according to the present embodiment. Basically, the programs and data stored in the server storage section 500s are similar to those stored in the server storage section 500s according to the first embodiment. A server program 501B allows a server processing section 200s to implement functions of the user management section 202, the online shopping management section 204, the publishing and registration section 214, the posting control section 242, and the reward giving section 244.

A distribution client program 503B allows the functions of the omitted functional sections described above to be implemented by a terminal processing section 200 of a user terminal 1500B according to the present embodiment.

The play data 700, the live commentary addition management data 730, and the modified reproduction data 760 are excluded from the server storage section 500s according to the present embodiment.

Figure 32:
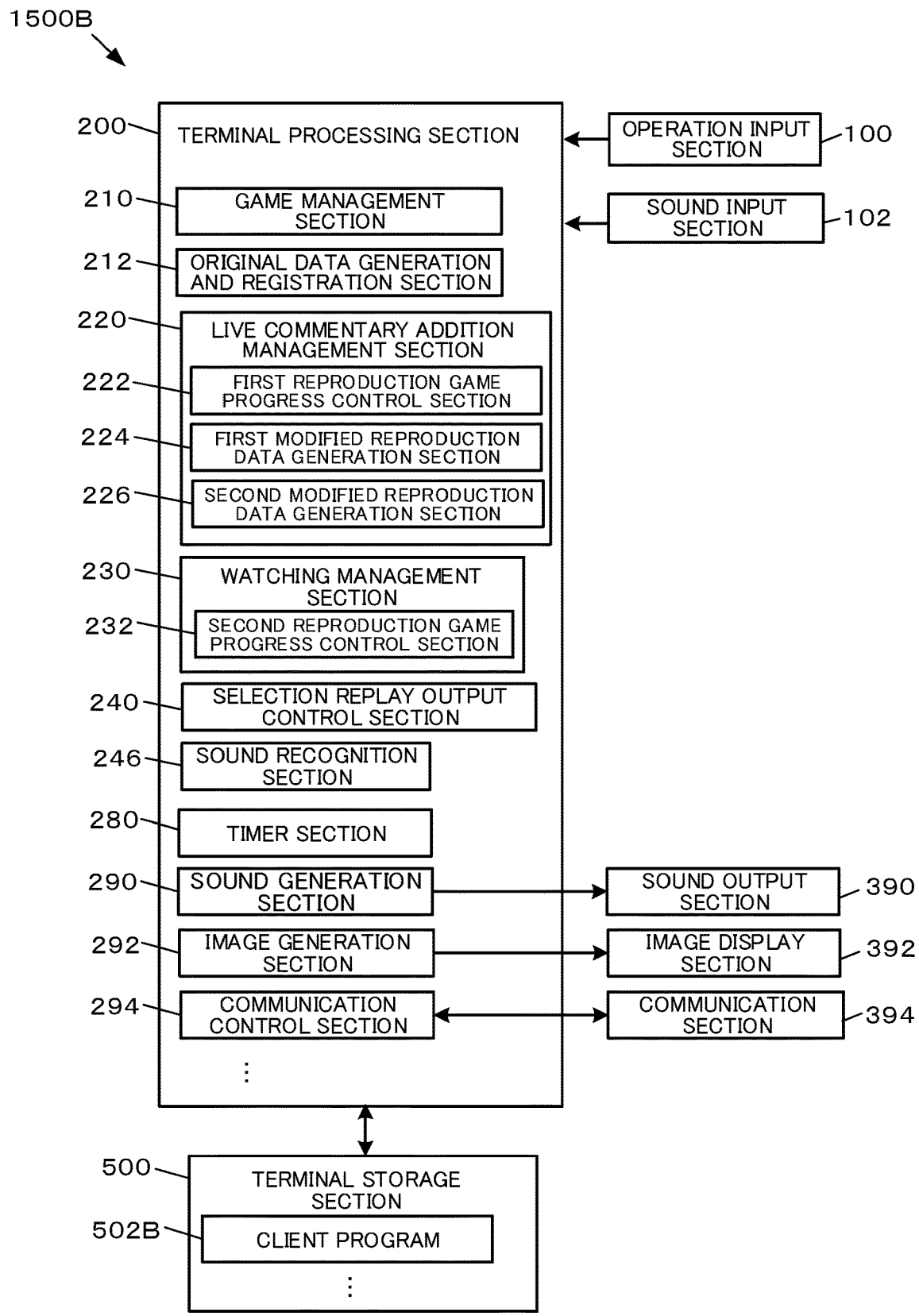
FIG. 32 is a functional block diagram illustrating a functional configuration example of a user terminal according to the second embodiment.

FIG. 32 is a functional block diagram illustrating a functional configuration example of the user terminal 1500B according to the present embodiment. As compared with the functional configuration of the user terminal 1500 according to the first embodiment, the functional configuration of the user terminal 1500B does not include the user terminal calculation section 260 but additionally includes the game management section 210, the original data generation and registration section 212, the live commentary addition management section 220, the watching management section 230, the selection replay output control section 240, and the sound recognition section 246.

The terminal storage section 500 according to the present embodiment stores a client program 502B obtained by downloading a distribution client program 503B. The terminal storage section 500 according to the present embodiment stores the play data 700, the live commentary addition management data 730, and the modified reproduction data 760.

Various kinds of data necessary for implementation of gameplay, live commentary addition, and watching (for example, the game initial setting data 510, the object definition data 520B, the object definition data 520C, the sound recognition dictionary data 554, and others) are downloaded as necessary from the server system 1100B. As a matter of course, these data may be downloaded and stored in advance together with the distribution client program 503B.

In the present embodiment, the process from the gameplay to the publishing of the original play video, the process related to live commentary addition, and the process related to watching are basically the same as those in the server system 1100 according to the first embodiment (see FIGS. 26 to 28), and thus it can be interpreted that these steps are executed by the user terminal 1500B as appropriate.

In a case of executing a process with the need for reference to or change of the user management data 600 on the user terminal 1500B, a request for provision or collation of necessary data is made to the server system 1100B as appropriate. Otherwise, a request for the process itself is made to the server system 1100B.

MODIFICATION EXAMPLES

The embodiments to which the present disclosure is applied have been described so far. However, the modes to which the present disclosure is applicable are not limited to the foregoing embodiments but the components can be added, omitted, or changed as appropriate.

Modification Example 1

For example, as for the distribution in the functional configuration, in the second embodiment, the game management section 210, the original data generation and registration section 212, the live commentary addition management section 220, the watching management section 230, the selection replay output control section 240, and the sound recognition section 246 in the first embodiment are shifted to the user terminal 1500B. However, the shifted functional sections are not limited to all of them but limited ones of them may be shifted.

Modification Example 2

In the foregoing embodiments, the video as a live commentary addition target can be not only the original play video but also an existing live commentary video or a modified video with an addition of a new viewer action object by watching. Alternatively, the live commentary addition target can be limited to the original play video.

In that case, the first modified reproduction data generation section 224 performs: 1) a first terminal replay output control to reproduce the original gameplay based on the original data to replay and output from the first user terminal (in this case, the user terminal of the live commentary user); and 2) at least one of a first object appearance control to cause a first object having not existed in the original gameplay to appear in accordance with an operation input on the first user terminal, a first sound superimposition control to superimpose a first sound input from the first user terminal on the original gameplay, and a first point-of-view setting control to set a first point of view as a reference of image generation in accordance with an operation input on the first user terminal, thereby to generate first modified reproduction data that is capable of reproducing first modified reproduction play in which the reproduction play of the original gameplay is modified.

In addition, the second modified reproduction data generation section 226 performs: a) a second terminal replay output control to reproduce gameplay based on the original data to replay and output from the second user terminal (in this case, the user terminal of the live commentary user); and b) at least one of a second object appearance control to cause a second object having not existed in the original gameplay to appear in accordance with an operation input on the second user terminal, a second sound superimposition control to superimpose a second sound input from the second user terminal on the original gameplay, and a second point-of-view setting control to set a second point of view as a reference of image generation in accordance with an operation input on the second user terminal, thereby to generate second modified reproduction data that is capable of reproducing second modified reproduction play in which the reproduction play of the original gameplay is modified.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A server system comprising:
at least one processor or circuit programmed to:
execute a first terminal replay output control to reproduce an original gameplay based on original data for reproducing the original gameplay to replay and output the original gameplay from a first user terminal while generating first modified reproduction data for reproducing a first modified reproduction play, the first modified reproduction play being a reproduction play in which the original gameplay is modified in accordance with an operation input on the first user terminal;
cause a game progress control function to replay the first modified reproduction play;
execute a second terminal replay output control to reproduce the first modified reproduction play based on the first modified reproduction data to replay and output from a second user terminal while generating second modified reproduction data for reproducing a second modified reproduction play, the second modified reproduction play being a reproduction play in which the first modified reproduction play is modified in accordance with an operation input on the second user terminal; and
perform a control to present the original gameplay, the first modified reproduction play, and the second modified reproduction play on a third user terminal in a selectable manner and reproduce a selected play to replay and output from the third user terminal, wherein
generating the first modified reproduction data includes causing the game progress control function to replay the first modified reproduction play with setting of an adaptation in accordance with the operation input on the first user terminal in the first terminal replay output control, and generating the first modified reproduction data including the setting of the adaptation.

2. The server system as defined in claim 1, wherein generating the first modified reproduction data includes at least one of:
a first object appearance control to cause a first object having not existed in the original gameplay to appear in accordance with the operation input on the first user terminal;
a first comment object appearance control to cause a first comment object to appear in accordance with the operation input on the first user terminal;
a first sound superimposition control to superimpose a first sound input from the first user terminal on the original gameplay; and
a first point-of-view setting control to set a first point of view as a reference of image generation in accordance with the operation input on the first user terminal.

3. The server system as defined in claim 2, wherein generating the second modified reproduction data includes at least one of:
a second object appearance control to cause a second object having not existed in the first modified reproduction play to appear in accordance with the operation input on the second user terminal;
a second comment object appearance control to cause a second comment object to appear in accordance with the operation input on the second user terminal;
a second sound superimposition control to superimpose a second sound input from the second user terminal on the first modified reproduction play; and
a second point-of-view setting control to set a second point of view as a reference of image generation in accordance with the operation input on the second user terminal.

4. The server system as defined in claim 3, wherein
the original data includes data of an original point of view as a reference for generating an image of the original gameplay,
generating the first modified reproduction data includes performing the first point-of-view setting control,
generating the second modified reproduction data includes performing the second point-of-view setting control, and
performing the control to replay and output from the third user terminal includes: in a case of replaying and outputting the original gameplay from the third user terminal, outputting a video image of the original gameplay viewed from the original point of view from the third user terminal; in a case of replaying and outputting the first modified reproduction play from the third user terminal, outputting a video image of the first modified reproduction play viewed from the first point of view from the third user terminal; and in a case of outputting the second modified reproduction play from the third user terminal, outputting a video image of the second modified reproduction play viewed from the second point of view from the third user terminal.

5. The server system as defined in claim 3, wherein
the original data includes data of an original point of view as a reference for generating an image of the original gameplay,
generating the first modified reproduction data includes performing the first point-of-view setting control,
generating the second modified reproduction data includes performing the second point-of-view setting control, and
performing the control to replay and output from the third user terminal includes performing a control to present the original point of view, the first point of view, and the second point of view on the third user terminal in a selectable manner and output a video image of the selected play viewed from a selected point of view from the third user terminal.

6. The server system as defined in claim 3, wherein
generating the first modified reproduction data includes performing the first sound superimposition control,
generating the second modified reproduction data includes performing the second sound superimposition control, and
performing the control to replay and output from the third user terminal includes performing a control to present the first sound and the second sound on the third user terminal in a selectable manner and output a sound in reproducing the selected play as a selected sound from the third user terminal.

7. The server system as defined in claim 3, wherein
generating the first modified reproduction data includes performing the first comment object appearance control,
generating the second modified reproduction data includes performing the second comment object appearance control, and
performing the control to replay and output from the third user terminal includes performing a control to present the first comment object and the second comment object on the third user terminal in a selectable manner and cause a comment object selected in accordance with a selection operation on the third user terminal to appear at the time of reproduction of the selected play.

8. The server system as defined in claim 1, wherein
the original data includes data for reconstructing a virtual three-dimensional space during the original gameplay,
the first modified reproduction data includes data for reconstructing a virtual three-dimensional space during the first modified reproduction play, and
the second modified reproduction data includes data for reconstructing a virtual three-dimensional space during the second modified reproduction play.

9. The server system as defined in claim 1, wherein generating the first modified reproduction data includes setting a replay speed based on the operation input on the first user terminal in the first terminal replay output control and generating the first modified reproduction data including setting of the replay speed.

10. The server system as defined in claim 1, wherein generating the second modified reproduction data includes setting a replay speed based on the operation input on the second user terminal in the second terminal replay output control and generating the second modified reproduction data including setting of the replay speed.

11. The server system as defined in claim 1, wherein generating the first modified reproduction data includes setting a replay in accordance with the operation input on the first user terminal in the first terminal replay output control and generating the first modified reproduction data including setting of the replay.

12. The server system as defined in claim 1, wherein generating the second modified reproduction data includes setting a replay in accordance with the operation input on the second user terminal in the second terminal replay output control and generating the second modified reproduction data including setting of the replay.

13. The server system as defined in claim 1, wherein
the game progress control function automatically controls a computer-controlled object in the first modified reproduction play, and
generating the first modified reproduction data includes setting an adaptation that has an influence on the computer-controlled object in accordance with the operation input on the first user terminal.

14. The server system as defined in claim 1, wherein the at least one processor or circuit is further programmed to:
generate and register the original data based on data with which the original gameplay was performed on one of a plurality of user terminals, the plurality of user terminals including the first user terminal, the second user terminal, and the third user terminal.

15. The server system as defined in claim 1, wherein the at least one processor or circuit is further programmed to:
perform a control to automatically post a video of reproducing the first modified reproduction play based on the first modified reproduction data and/or a video of reproducing the second modified reproduction play based on the second modified reproduction data to a predetermined video site.

16. A play data community system comprising:
the first user terminal;
the second user terminal; and
the server system as defined in claim 1 that is communicable with the first and second user terminals.

17. A server system comprising:
at least one processor or circuit programmed to:
execute a first terminal replay output control to reproduce an original gameplay based on original data for reproducing the original gameplay to replay and output the original gameplay from a first user terminal while generating first modified reproduction data for reproducing a first modified reproduction play, the first modified reproduction play being a reproduction play in which the original gameplay is modified in accordance with an operation input on the first user terminal;
execute a second terminal replay output control to reproduce the first modified reproduction play based on the first modified reproduction data to replay and output from a second user terminal while generating second modified reproduction data for reproducing a second modified reproduction play, the second modified reproduction play being a reproduction play in which the first modified reproduction play is modified in accordance with an operation input on the second user terminal;
cause a game progress control function to replay the second modified reproduction play; and
perform a control to present the original gameplay, the first modified reproduction play, and the second modified reproduction play on a third user terminal in a selectable manner and reproduce a selected play to replay and output from the third user terminal, wherein
generating the second modified reproduction data includes causing the game progress control function to replay the second modified reproduction play with setting of an adaptation in accordance with the operation input on the second user terminal in the second terminal replay output control, and generating the second modified reproduction data including the setting of the adaptation.

18. The server system as defined in claim 17, wherein
the game progress control function automatically controls a computer-controlled object in the second modified reproduction play, and
generating the second modified reproduction data includes setting an adaptation that has an influence on the computer-controlled object in accordance with the operation input on the second user terminal.

19. A server system comprising:
at least one processor or circuit programmed to:
execute a first terminal replay output control to reproduce an original gameplay based on original data for reproducing the original gameplay to replay and output the original gameplay from a first user terminal while generating first modified reproduction data for reproducing a first modified reproduction play, the first modified reproduction play being a reproduction play in which the original gameplay is modified in accordance with an operation input on the first user terminal;
cause a game progress control function to replay the first modified reproduction play;
execute a second terminal replay output control to reproduce the original gameplay based on the original data to replay and output the original gameplay from the second user terminal while generating second modified reproduction data for reproducing a second modified reproduction play, the second modified reproduction play being a reproduction play in which the original gameplay is modified in accordance with an operation input on the second user terminal; and perform a control to present the original gameplay, the first modified reproduction play, and the second modified reproduction play on a third user terminal in a selectable manner and reproduce a selected play to replay and output from the third user terminal, wherein generating the first modified reproduction data includes causing the game progress control function to replay the first modified reproduction play with setting of an adaptation in accordance with the operation input on the first user terminal in the first terminal replay output control, and generating the first modified reproduction data including the setting of the adaptation.

20. The server system as defined in claim 19, wherein generating the first modified reproduction data includes at least one of:

a first object appearance control to cause a first object having not existed in the original gameplay to appear in accordance with the operation input on the first user terminal;

a first comment object appearance control to cause a first comment object to appear in accordance with the operation input on the first user terminal;

a first sound superimposition control to superimpose a first sound input from the first user terminal on the original gameplay; and a first point-of-view setting control to set a first point of view as a reference of image generation in accordance with the operation input on the first user terminal.

21. The server system as defined in claim 20, wherein generating the second modified reproduction data includes at least one of:

a second object appearance control to cause a second object having not existed in the original gameplay to appear in accordance with the operation input on the second user terminal;

a second comment object appearance control to cause a second comment object to appear in accordance with the operation input on the second user terminal;

a second sound superimposition control to superimpose a second sound input from the second user terminal on the original gameplay; and a second point-of-view setting control to set a second point of view as a reference of image generation in accordance with the operation input on the second user terminal.

22. A server system comprising:

at least one processor or circuit programmed to:

execute a first terminal replay output control to reproduce an original gameplay based on original data for reproducing the original gameplay to replay and output the original gameplay from a first user terminal while generating first modified reproduction data for reproducing a first modified reproduction play, the first modified reproduction play being a reproduction play in which the original gameplay is modified in accordance with an operation input on the first user terminal;

execute a second terminal replay output control to reproduce the original gameplay based on the original data to replay and output the original gameplay from the second user terminal while generating second modified reproduction data for reproducing a second modified reproduction play, the second modified reproduction play being a reproduction play in which the original gameplay is modified in accordance with an operation input on the second user terminal;

cause a game progress control function to replay the second modified reproduction play; and perform a control to present the original gameplay, the first modified reproduction play, and the second modified reproduction play on a third user terminal in a selectable manner and reproduce a selected play to replay and output from the third user terminal, wherein generating the second modified reproduction data includes causing the game progress control function to replay the second modified reproduction play with setting of an adaptation in accordance with the operation input on the second user terminal in the second terminal replay output control, and generating the second modified reproduction data including the setting of the adaptation.

* * * * *